(12) United States Patent
Fukuda et al.

(10) Patent No.: US 7,526,646 B2
(45) Date of Patent: Apr. 28, 2009

(54) AUTHENTICATION SYSTEM AND AN AUTHENTICATION METHOD FOR AUTHENTICATING MOBILE INFORMATION TERMINALS

(75) Inventors: Junko Fukuda, Kanagawa (JP); Keigo Ihara, Tokyo (JP); Takahiko Sueyoshi, Tokyo (JP); Yuji Ayatsuka, Tokyo (JP); Nobuyuki Matsushita, Kanagawa (JP); Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1427 days.

(21) Appl. No.: 10/145,116

(22) Filed: May 15, 2002

(65) Prior Publication Data

US 2002/0184539 A1    Dec. 5, 2002

(30) Foreign Application Priority Data

May 18, 2001    (JP)    ............................. 2001-148576

(51) Int. Cl.
*H04L 9/00*    (2006.01)
*H04N 7/167*    (2006.01)
(52) U.S. Cl. ...................................... 713/168; 380/229
(58) Field of Classification Search ....................... None
See application file for complete search history.

(56) References Cited

U.S. PATENT DOCUMENTS

| | | | | |
|---|---|---|---|---|
| 6,332,133 B1* | 12/2001 | Takayama | ..................... | 705/39 |
| 6,543,052 B1* | 4/2003 | Ogasawara | ................... | 725/60 |
| 6,622,923 B1* | 9/2003 | Walmsley et al. | ........... | 235/494 |
| 6,636,249 B1* | 10/2003 | Rekimoto | ................... | 715/849 |
| 6,736,322 B2* | 5/2004 | Gobburu et al. | ........ | 235/462.46 |
| 6,749,120 B2* | 6/2004 | Hung et al. | ............ | 235/472.01 |
| 6,751,352 B1* | 6/2004 | Baharav et al. | ............. | 382/183 |
| 7,203,158 B2* | 4/2007 | Oshima et al. | .............. | 370/208 |
| 2003/0040326 A1* | 2/2003 | Levy et al. | ................... | 455/466 |
| 2004/0022444 A1* | 2/2004 | Rhoads | ....................... | 382/232 |

OTHER PUBLICATIONS

Rekimoto et al. (paper—CyberCode: Designing Augmented Reality Environments with Visual Tags), Apr. 2000□□http://citeseer.ist.psu.edu/rekimoto00cybercode.html.*

* cited by examiner

*Primary Examiner*—Gilberto Barron, Jr.
*Assistant Examiner*—Virgil Herring
(74) *Attorney, Agent, or Firm*—Oblon, Spivak, McClelland, Maier & Neustadt, P.C.

(57) ABSTRACT

An authentication system for authenticating a mobile information terminal is disclosed. The system includes elements for: issuing a user ID to the terminal upon program issuing receipt therefrom; generating a random number based on the user ID and a time of issuing request receipt; registering the random number and the time of receipt in conjunction with the user ID; generating a first program for creating a first image embedded with the user ID, in accordance with the random number, user ID and time of receipt; transmitting the first program to the terminal; picking up the first image displayed on the terminal; recognizing first information from the picked-up first image while extracting the user ID from the same image concurrently; retrieving the registered random number and time of receipt in keeping with the user ID; generating a second program for creating a second image based on the retrieved random number, time of receipt, and user ID; and authenticating the terminal by verifying a match between second information from the second image generated by execution of the second program on the one hand, and the recognized first information on the other hand.

7 Claims, 27 Drawing Sheets

FIG. 2

| NAME | USER ID | ISSUE START TIME | SEED FOR RANDOM NUMBER GENERATION | USER INFORMATION |
|---|---|---|---|---|
| XXX YAMADA | U$_{001}$ | T$_{001}$ | SEED$_{001}$ | ... |
| XXX TANAKA | U$_{002}$ | T$_{002}$ | SEED$_{002}$ | |
| XXX SUZUKI | U$_{003}$ | T$_{003}$ | SEED$_{003}$ | |
| ... | ... | ... | ... | |

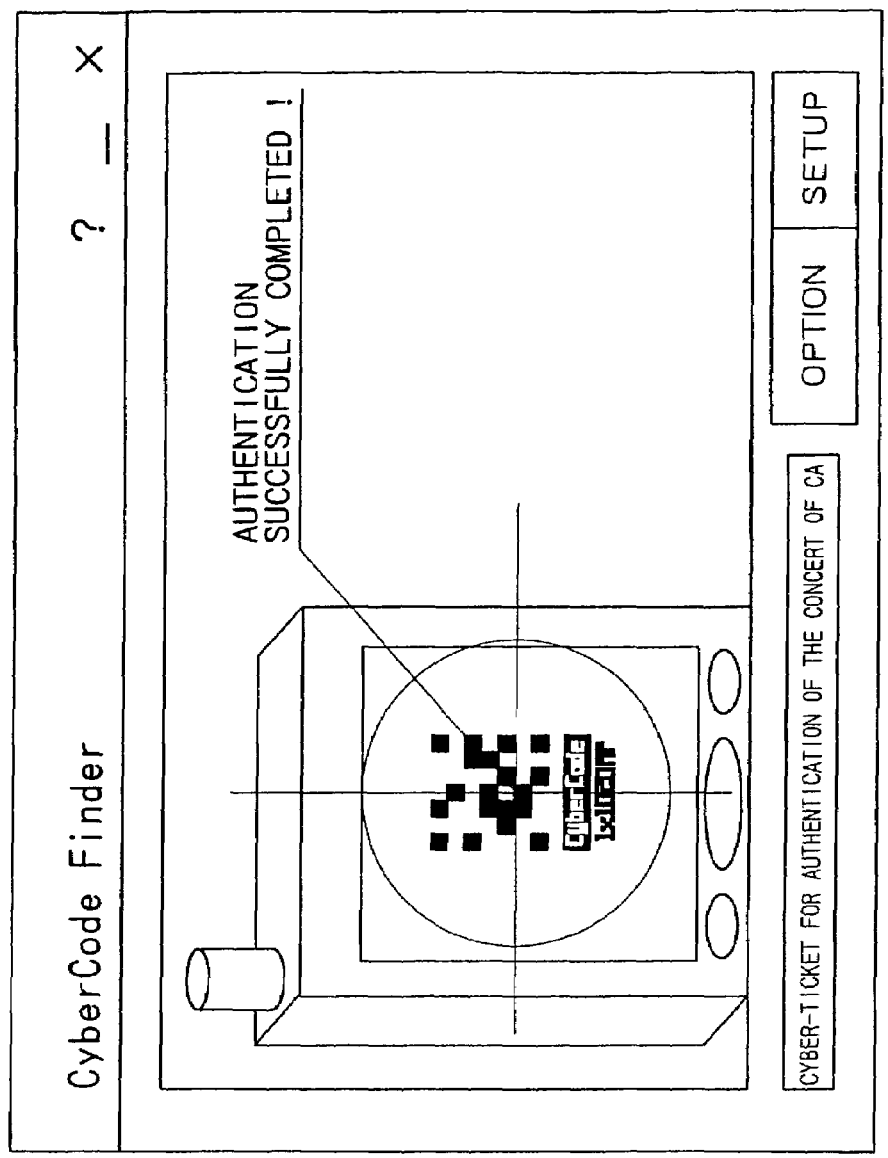

AUTHENTICATION SYSTEM AND AN AUTHENTICATION METHOD FOR AUTHENTICATING MOBILE INFORMATION TERMINALS

BACKGROUND OF THE INVENTION

The present invention relates to an authentication system and an authentication method for authenticating mobile information terminals such as mobile telephones.

Many industrial fields have adopted a bar code system based on bar codes that represent alphanumeric characters describing the types and status of produces on which the codes are written. The bar code system allows the products to be identified in type and status when their codes are read and interpreted.

Most conventional bar codes are known as one-dimensional bar codes each made up of bars (black bar-like portions) of different thicknesses combined with spaces (blanks). Each bar-space combination constitutes a code pattern representative of a code number for product identification and management.

A two-dimensional bar code system has also been proposed. This system is based on two-dimensional codes each made of a plurality of square cells arranged into a two-dimensional code pattern in keeping with predetermined layout rules. Each code pattern represents a unique code number that may be used as an authentication key for authenticating a specific user.

For example, the two-dimensional bar code system may be employed by a firm that organizes a concert. In this case, the firm may distribute two-dimensional codes as authentication keys to users who, having bought their tickets, are allowed to enter the concert hall when submitting their codes. Specifically, the organizing firm assigns a unique code number to each of the users who bought the tickets to the concert. The firm then runs a two-dimensional code generation program that generates two-dimensional codes upon receipt of the assigned code numbers. The two-dimensional codes thus generated are distributed to the users as their authentication keys. After receiving a two-dimensional code, each user presents the code to a receptionist at the concert hall. When the code is authenticated by means of a specific authentication terminal, the user is admitted into the hall.

One disadvantage of the above-mentioned two-dimensional code generation program is that an unscrupulous third party who stole a code number could cause the program to generate an identical two-dimensional code for illegal use. That is because the program cannot help generating the same code when duly presented with a specific code number.

Another disadvantage of the program above is the possibility of impersonation by a third party. An unscrupulous person who got hold of either a medium on which a two-dimensional code is printed or two-dimensional code image data can impersonate the legitimate holder of the code in question.

SUMMARY OF THE INVENTION

The present invention has been made in view of the above circumstances for allowing each user to alter a two-dimensional code generation program itself for use as an authentication key so that each user possessing a unique version of the program is allowed to generate a specific two-dimensional code for highly accurate user authentication.

In carrying out the invention and according to one aspect thereof, there is provided an authentication system for authenticating a mobile information terminal having a displaying element for displaying an image, the authentication system including: an issuing element for issuing a user ID to the mobile information terminal upon receipt of a request to issue a program from the mobile information terminal; a random number generating element for generating a random number based on the user ID issued by the issuing element and on a time of receipt of the issuing request; a registering element for registering the random number and the time of receipt in conjunction with the user ID; a first program generating element for generating a first program for creating a first image embedded with the user ID, in accordance with the random number generated by the random number generating element, with the user ID, and with the time of receipt; a transmitting element for transmitting the first program generated by the first program generating element to the mobile information terminal; an image pickup element for picking up the first image displayed on the displaying element of the mobile information terminal; a recognizing element for recognizing first information corresponding to the first image picked up by the image pickup element while extracting the user ID from the first image concurrently; a retrieving element for retrieving the random number and the time of receipt registered by the registering element, in accordance with the user ID recognized by the recognizing element; a second program generating element for generating a second program for creating a second image based on the random number, on the time of receipt retrieved by the retrieving element, and on the user ID; and an authenticating element for authenticating the mobile information terminal displaying the first image, by verifying a match between second information corresponding to the second image generated by execution of the second program generated by the second program generating element on the one hand, and the first information recognized by the recognizing element on the other hand.

With the inventive authentication system, as outlined above, the issuing element first issues a user ID to the mobile information terminal upon receipt of a request to issue a program from the mobile information terminal. A random number is then generated by the random number generating element based on the user ID issued by the issuing element and on a time of receipt of the issuing request. The registering element registers the random number and the time of receipt in conjunction with the user ID. A first program for creating a first image embedded with the user ID is generated by the first program generating element in accordance with the random number generated by the random number generating element, with the user ID, and with the time of receipt. The transmitting element transmits the first program thus generated by the first program generating element to the mobile information terminal The first image displayed on the displaying element of the mobile information terminal is picked up by the image pickup element. The recognizing element recognizes first information corresponding to the first image picked up by the image pickup element while extracting the user ID from the first image concurrently. The random number and the time of receipt registered by the registering element are retrieved by the retrieving element in accordance with the user ID recognized by the recognizing element. A second program for creating a second image is generated by the second program generating element based on the random number, on the time of receipt retrieved by the retrieving element, and on the user ID. The authenticating element then authenticates the mobile information terminal displaying the first image, by verifying a match between second information corresponding to the second image generated by execution of the second program generated by the second program generating element on the one hand, and the first information recognized by the recognizing element on the other hand.

Other objects, features and advantages of the invention will become more apparent upon a reading of the following description and appended drawings.

BRIEF DESCRIPTION OF THE DRAWINGS

These and other objects of the invention will be seen by reference to the description, taken in connection with the accompanying drawing, in which:

FIG. 2 is a tabular view of typical user information records held in a registered user information database;

FIG. 26 is a schematic view of a typical screen that appears when a CyberCode is successfully authenticated.

DETAILED DESCRIPTION OF THE PREFERRED EMBODIMENTS

Figure 1:
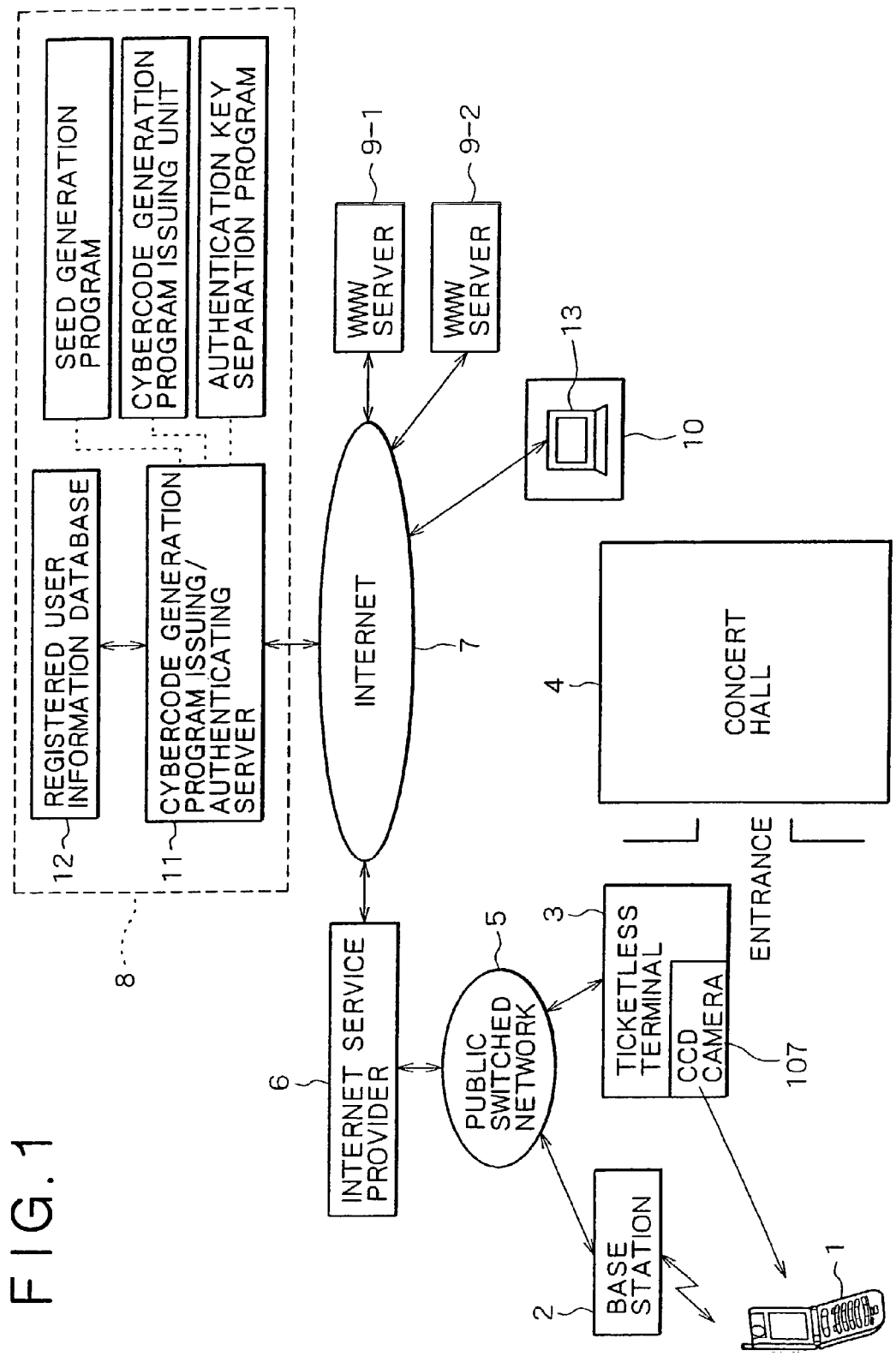
FIG. 1 is a schematic view of a ticketless system to which this invention is applied.

Preferred embodiments of this invention will now be described by referring to the accompanying drawings. FIG. 1 is a schematic view of a ticketless system embodying the invention.

A camera-equipped digital mobile telephone 1 (simply called the mobile telephone 1 hereunder) is connected to a public switched network 5 via one of base stations 2 that function as fixed wireless terminals. Each base station 2 is set up in one of cells constituting a geographical area covered by a communication service.

The base station 2 is wirelessly connected to the mobile telephone 1 (i.e., a mobile wireless terminal) illustratively on a W-CDMA (Wideband-Code Division Multiple Access) basis. The wireless connection allows large quantities of data to be communicated between the two terminals at transfer speeds of up to 2 Mbps using a 2 GHz frequency band.

Each base station 2 is wired to the public switched network 5. In turn, the public switched network 5 is connected to the Internet 7 via an Internet service provider 6 as well as to wired subscriber terminal equipment, computer networks and intranets, not shown.

As mentioned, each mobile telephone 1 can communicate large quantities of data with the base station 2 at high speed on a W-CDMA basis. The mobile telephone 1 is thus capable of carrying out diverse kinds of data communication including sending and receiving of e-mail, browsing of simple-format websites, and exchanges of images.

The mobile telephone 1 includes an i-appli (registered trademark) function that permits downloading of programs written in Java (registered trademark) from a CyberCode authentication site 8. These programs are called Java applets.

Figure 3:
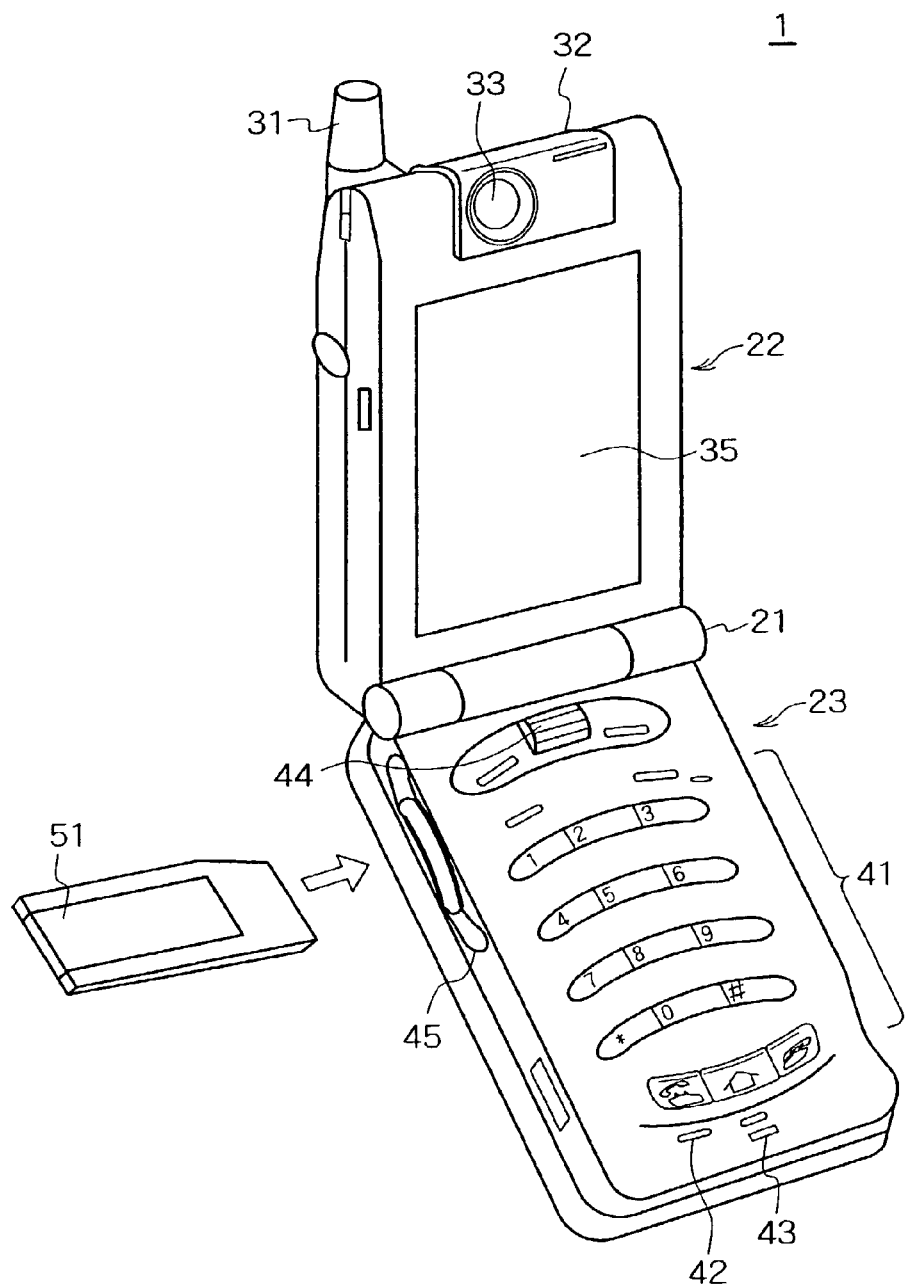
FIG. 3 is an external view of a mobile telephone.
Figure 4:
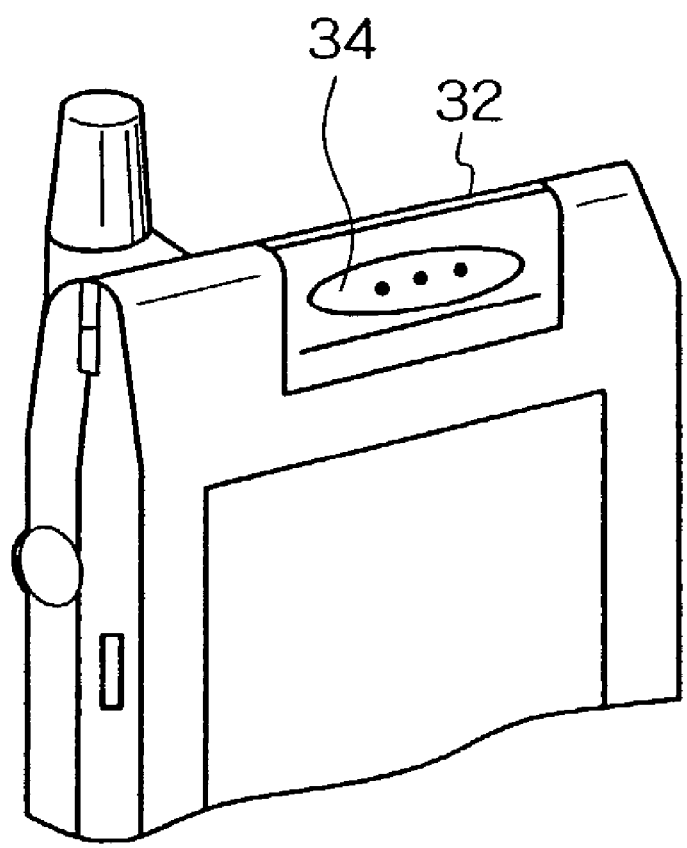
FIG. 4 is an external view of a display unit of the mobile telephone.

Illustratively, the mobile telephone 1 is connected to the CyberCode authentication site 8 via the public switched network 5, the Internet service provider 6, and the Internet 7. With the connection established, the mobile telephone 1 may download a program (Java applet) designed to generate a specific two-dimensional code. Executing the downloaded program causes the mobile telephone 1 to generate the two-dimensional code that appears on a liquid crystal display 35 (FIG. 3). The displayed two-dimensional code on the LCD 35 is used as an alternative admission ticket (i.e., authentication key) allowing the ticket holder to get into a concert hall 4.

In the description that follows, CyberCode (registered trademark) developed by this applicant will be cited as the preferred two-dimensional code.

A ticketless terminal 3 is constituted illustratively by a personal computer including a CCD (Charge Coupled Device) camera 107 (FIG. 7) and is set up near the entrance to the concert hall 4. In operation, the CCD camera 107 of the terminal 3 picks up a displayed CyberCode off the LCD 35 of the mobile telephone 1. The terminal 3 recognizes a CyberCode pattern from CyberCode image data thus obtained, and carries out a suitable process according to the acquired code pattern.

Figure 7:
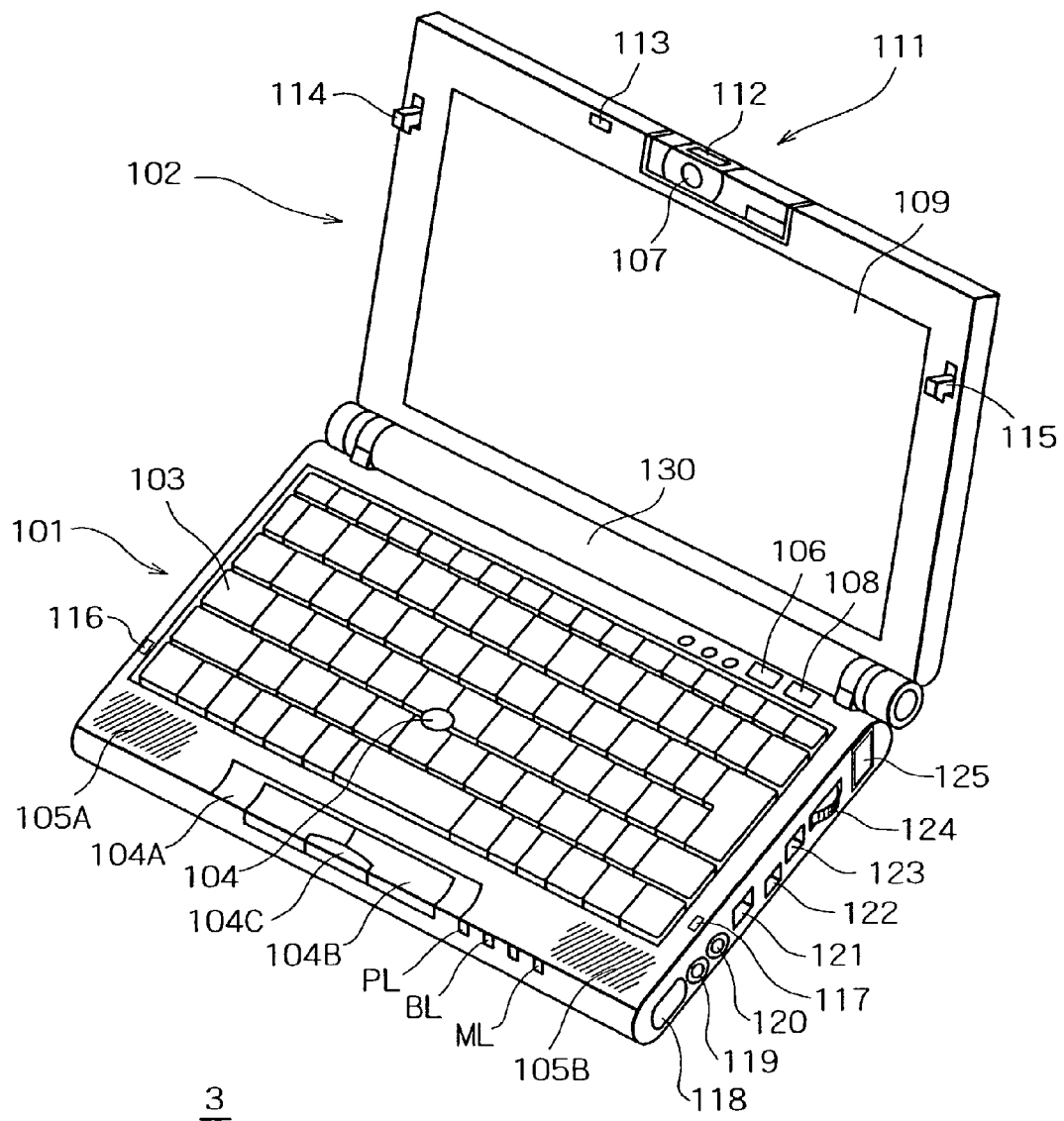
FIG. 7 is a perspective view of a ticketless terminal.

Illustratively, the ticketless terminal 3 transmits a code number retrieved from the code pattern to the CyberCode authentication site 8 over the public switched network 5 through the Internet 7, requesting the site 8 to perform user identification. Upon receipt of the result of authentication from the CyberCode authentication site 8, the ticketless terminal 3 indicates the result on a liquid crystal display 109 (FIG. 7).

The Internet 7 is connected with the Internet service provider 6, CyberCode authentication site 8, WWW (World Wide Web) servers 9-1, 9-2 (simply called the WWW server 9 hereunder if there is no need to distinguish one server from another), and firms 10.

The CyberCode authentication site 8 includes a CyberCode generation program issuing/authenticating server 11 and a registered user information database (DB) 12. The CyberCode generation program issuing/authenticating server 11 accepts in advance registration of user information such as the address, name, and telephone number of the user of each mobile telephone 1. These items of information when accepted are written to the registered user information database 12.

FIG. 2 is a tabular view of typical user information records held in the registered user information database 12. In FIG. 2, each user ID assigned to the user who requested the issue of a CyberCode generation program is recorded in conjunction with relevant user information. When recorded, each user ID is further associated with an issue start time TID of the CyberCode generation program and a seed ID for random number generation.

The user information is utilized primarily for settling payment in connection with the issued CyberCode generation program (i.e., cyber-ticket for authentication). Specifically, the user information is referenced by the credit card company or bank involved when completing transactions of payment regarding each user.

The CyberCode generation program issuing/authenticating server 11 accepts registration of a user ID from any user wishing to get the CyberCode generation program issued. With the registration accepted, the server 11 issues a unique user ID (UID) to the user in question. The server 11 transmits the user ID thus issued to the mobile telephone 1 over the Internet 7 while concurrently writing the user ID to the registered user information database 12 in conjunction with relevant user information.

The CyberCode generation program issuing/authenticating server 11 receives from the mobile telephone 1 a request along with the user ID to transmit a CyberCode generation program. Upon receipt of the request, the server 11 activates a seed generation program to generate a seed ID for random number generation in accordance with the received user ID and a current time TID.

The CyberCode generation program issuing/authenticating server 11 creates the CyberCode generation program based on the generated seed ID for random number generation, the user ID, and the current time TID. After transmitting the created CyberCode generation program to the mobile telephone 1 over the Internet 7, the server 11 writes the CyberCode issue start time TID and the created seed ID for random number generation into the registered user information database 12 in conjunction with the user ID in question.

The seed ID for random number generation, unique to each CyberCode generation program, is used to generate a CyberCode (i.e., code number) randomly for each user and is managed in the registered user information database 12. Because a leak of any seed ID for random number generation can compromise data security, the registered user information database 12 may alternatively be arranged to keep only the user ID and CyberCode issue start time TID per user, i.e., the data for creating a seed ID for random number generation. The arrangement if implemented will effectively prevent the leak of any seed ID.

The CyberCode generation program issuing/authenticating server 11 receives from the ticketless terminal 3 a code number, i.e., a number that corresponds to the code pattern recognized by the CCD camera 107 from the CyberCode displayed on the LCD 35 of the mobile telephone 1. With the code number received, the server 11 activates an authentication key separation program to separate a user ID from the code number in question.

The CyberCode generation program issuing/authenticating server 11 then searches the registered user information database 12 for the issue start time TID and seed ID for random number generation corresponding to the separated user ID. Using the retrieved TID and seed ID, the server 11 again creates the CyberCode generation program and generates a CyberCode by executing the created program. The CyberCode thus generated is used in carrying out a user authentication process.

The CyberCode generation program issuing/authenticating server 11 is connected over the Internet 7 to a personal computer 13 owned by a firm 10. Given a request from the personal computer 13 to issue a cyber-ticket for authentication, the server 11 issues the CyberCode generation program to a specific user and performs a fee-charging process regarding the firm 10 in the manner described above.

The WWW server 9 is accessed in accordance with TCP/IP (Transmission Control Protocol/Internet Protocol) by the mobile telephone 1 and by the personal computer 13 possessed by the firm 10, and offers the accessing parties diverse kinds of information offered by various websites. Such information is described illustratively in page description language such as HTML (HyperText Markup Language), XML (extensible Markup Language), or compact HTML. Although FIG. 1 shows only two WWW servers 9-1 and 9-2, a plurality of WWW servers 9 are obviously connected to the Internet 7.

The firm 10 is illustratively one which organizes a concert to be held in the concert hall 4. Using the personal computer 13, the firm 10 may request the CyberCode authentication site 8 over the Internet 7 to issue cyber-tickets, to effect user authentication, and to send to the firm 10 the charges covering the costs of issuing the tickets. Alternatively, the firm 10 may utilize other methods (e.g., on an offline basis) to request the CyberCode authentication site 8 to issue cyber-tickets, effect user authentication, and send to the firm 10 the charges of the ticket issuing costs.

FIG. 3 is an external view of the mobile telephone 1. As shown in FIG. 3, the mobile telephone 1 is made up of a display unit 22 and a body 23. The two components are coupled by a centrally located hinge 21 in a foldable manner.

The display unit 22 has a retractable antenna 31 on its top left portion. The mobile telephone 1 sends and receives radio waves to and from the base station 2 (i.e., fixed wireless station) via the antenna 31.

The display unit 22 also has a camera unit 32 furnished at its top center in a manner rotatable over a range of about 180 degrees. A CCD camera 33 in the camera unit 32 allows the user of the mobile telephone 1 to take pictures of desired objects If the user positions the camera unit 32 by rotating it about 180 degrees, the display unit 22 is positioned so that a speaker 34 at the center back of the camera unit 32 comes in front. In this state, the mobile telephone 1 is switched to regular voice communication mode.

The liquid crystal display 35 is furnished on the front of the display unit 22. The LCD 35 displays a radio wave reception state, a battery level, telephone directory entries including names, telephone numbers, and call records; e-mail text, simple-format website content, and images taken by the CCD camera 33 of the camera unit 32.

The body 23 composes on its surface various operation keys 41 including numeric keys 0 through 9, an off-hook key, a redial key, an on-hook/power key, a clear key, and an e-mail key. Operating any of the operation keys 41 enters the corresponding instruction into the mobile telephone 1.

Under the operation keys 41 of the body 23 are a memo button 42 and a microphone 43. Operating the memo button 42 causes the mobile telephone 1 to record the other party's voice during the call. The microphone 43 of the telephone 1 picks up the user's voice while the call is being effected.

A rotatable jog dial 44 is furnished above the operation keys 41 on the body 23, in such a manner that the dial 44 slightly projects from the surface of the body 23. As the jog dial 44 is rotated, the mobile telephone 1 accordingly performs diverse operations displayed on the LCD 35 such as scrolling up and down a telephone directory list or an e-mail text, feeding pages of a simple-format website, or sending an image from one display position to another.

For example, in response to the user's rotating operation of the jog dial 44, the body 23 may highlight a desired telephone number from among a plurality of telephone numbers in the telephone directory list displayed on the LCD 35, and select the highlighted number definitely when the user pushes the jog dial 44 into the body 23. A call is automatically placed to the telephone number thus selected.

The body 23 has a battery pack incorporated in its rear portion, not shown. Turning on the on-hook/power key causes the battery pack to power the internal circuits and brings the telephone into an operable state.

In the top left-side portion of the body 23 is a memory card slot 45 that can accommodate a memory card 51 in removable fashion. Pressing the memo button 42 causes the mobile telephone 1 to start recording the other party's voice into the memory card 51 loaded in the slot 45. In response to the user's suitable operation, the mobile telephone 1 may store e-mail text, simple-format website content, and/or an image taken by the CCD camera 33 into the loaded memory card 51.

The memory card 51 shown in FIG. 3 is illustratively a flash memory card called Memory Stick (registered trademark) developed by this applicant. This memory card 51 is housed in a small, thin plastic enclosure which measures 21.5 mm by 50 mm by 2.8 mm and which contains flash memory elements constituting an EEPROM (Electrically Erasable and Programmable Read Only Memory), a nonvolatile memory to and from which data may be electrically written and erased. A 10-pin terminal permits writing and reading of data such as images, voices, and music to and from the memory card 51.

The memory card 51 adopts a proprietary serial protocol that ensures compatibility between devices in which it may be used even if the specifications for a built-in flash memory are altered in order to address an increased storage capacity. The protocol permits high-speed performance with write speeds of up to 1.5 MB/S and read speeds of up to 2.45 MB/S. A write-protect switch designed to prevent accidental data erasure affords high reliability to the memory card.

The mobile telephone 1 structured to accommodate the memory card 51 may thus share data with other electronic devices that utilize the card 51 in common.

Figure 5:
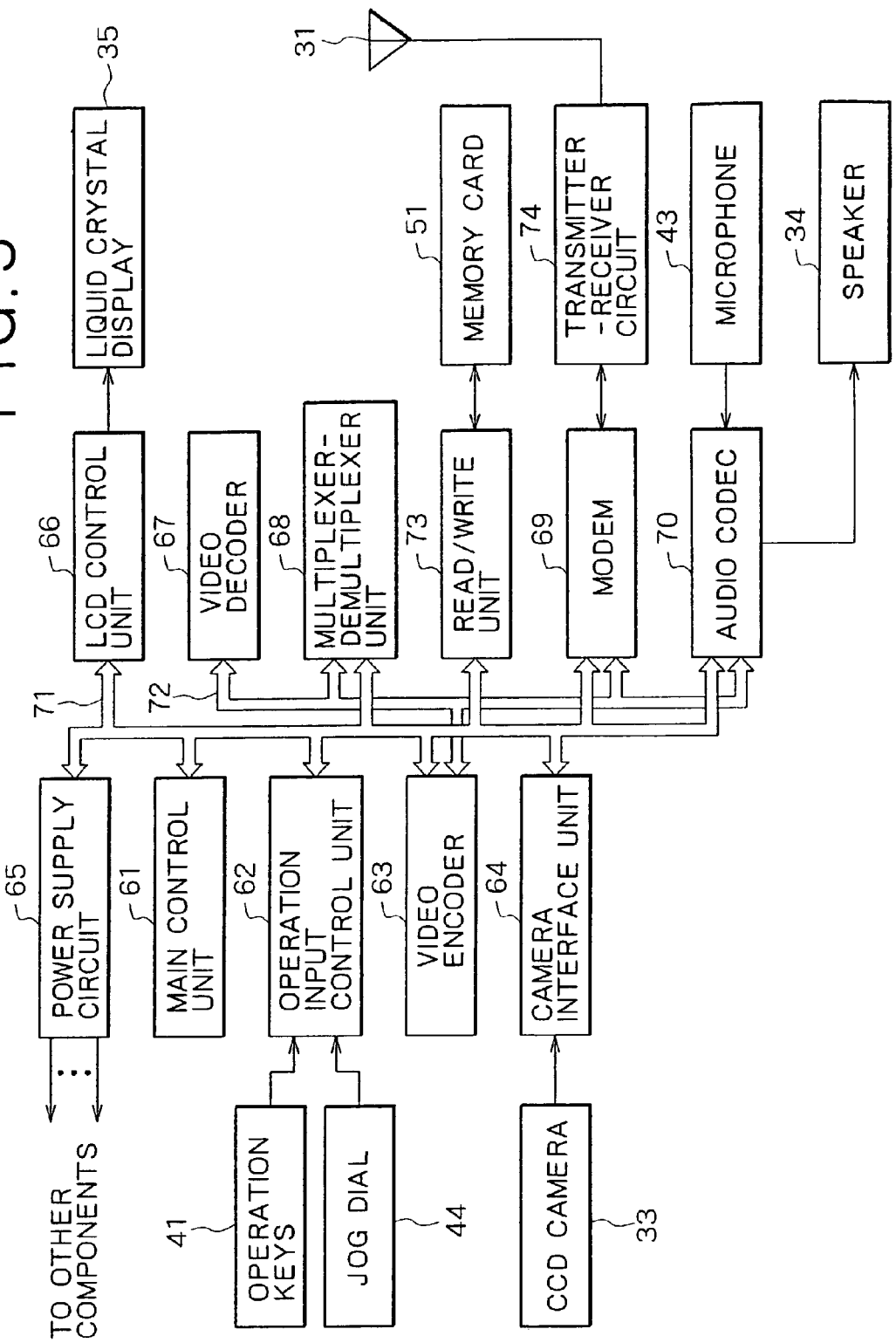
FIG. 5 is a block diagram showing a typical internal structure of the mobile telephone.

As shown in FIG. 5, the mobile telephone 1 includes a main control unit 61 that provides overall control on the display unit 22 and body 23. Inside the telephone 1, the main control unit 61, a power supply circuit 65, an operation input control unit 62, a video encoder 63, an camera interface (I/F) unit 64, an LCD (Liquid Crystal Display) control unit 66, a multiplexer-demultiplexer unit 68, a read/write unit 73, a modem 69, and an audio codec 70 are interconnected via a main bus 71. Likewise the video encoder 63, a video decoder 67, the multiplexer-demultiplexer unit 68, the modem 69, and the audio codec 70 are interconnected via a synchronous bus 72.

When the user turns on the on-hook/power key, the power supply circuit 65 causes the battery pack to power the circuits involved. This brings the mobile telephone 1 into an operable state.

The main control unit 61 of the mobile telephone 1 includes a CPU (Central Processing Unit), a ROM (Read Only Memory) and a RAM (Random Access Memory). Under control of the main control unit 61, the mobile telephone 1 picks up a voice signal through the microphone 43 in voice communication mode and converts the collected voice signal into digital audio data through the audio codec 70. The mobile telephone 1 subjects the resulting digital audio data to a spread-spectrum encoding process of the modem 69. The processed data undergo a digital-to-analog conversion process and a frequency conversion process of a transmitter-receiver circuit 74 before being transmitted to the antenna 31.

In voice communication mode, the mobile telephone 1 receives a signal through the antenna 31, amplifies the received signal, and subjects the amplified signal to frequency conversion and analog-to-digital conversion. The converted signal undergoes a spread-spectrum decoding process of the modem 69 before being converted to an analog audio signal by the audio codec 70. The mobile telephone 1 then causes the speaker 34 to output a sound corresponding to the analog audio signal.

In data communication mode, the mobile telephone 1 transmits e-mail as follows: input of e-mail text data is accepted following the user's manipulation of the operation keys 41 and jog dial 44. The input text data are forwarded to the main control unit 61 through the operation input control unit 62.

The main control unit 61 subjects the text data first to spread-spectrum encoding process of the modem 69 and then to digital-to-analog conversion and frequency conversion of the transmitter-receiver circuit 74. The converted data are transmitted to the base station 2 via the antenna 31.

Also in data communication mode, the mobile telephone 1 receives e-mail as follows: a signal is received from the base station 2 via the antenna 31. The received signal is subjected to spread-spectrum decoding process of the modem 69 to restore the original text data. The text data are sent through the LCD control unit 66 to the LCD 35 for display thereon.

In response to the user's operation, the mobile telephone 1 may store received e-mails into the memory card 51 through the read/write unit 73.

In data communication mode, the mobile telephone 1 may transmit image data acquired by the CCD camera 33. In that case, the image data are fed to the video encoder 63 through the camera interface unit 64.

When not transmitting the image data obtained by the CCD camera 33, the mobile telephone 1 may forward the data through the camera interface unit 64 and LCD control unit 66 to the LCD 35 for direct display thereon.

The video encoder 63 converts the image data from the CCD camera 33 illustratively into compression-coded image data using a suitable coding method such as MPEG2 (Moving Picture Experts Group Phase 2) or MPEG4. The image data thus coded are fed to the multiplexer-demultiplexer unit 68.

At the same time, any voice picked up by the microphone 43 during image pickup by the CCD camera 33 is converted to digital audio data by the audio codec 70 of the mobile telephone 1. The digital audio data are forwarded to the multiplexer-demultiplexer unit 68.

The multiplexer-demultiplexer unit 68 multiplexes the coded image data from the video encoder 63 with the audio data from the audio codec 70 using a predetermined method. The multiplexed data are subjected first to spread-spectrum encoding process of the modem 69 and then to digital-to-analog conversion and frequency conversion of the transmitter-receiver circuit 74. The converted data are transmitted via the antenna 31.

In data communication mode, the mobile telephone 1 may receive dynamic image file data linked illustratively to a simple-format website as follows: a signal is received from the base station 2 via the antenna 31. The received signal is subjected to spread-spectrum decoding of the modem 69. Multiplexed data obtained from decoding by the modem 69 are sent to the multiplexer-demultiplexer unit 68.

The multiplexer-demultiplexer unit 68 demultiplexes the multiplexed data into coded image data and audio data. Over the synchronous bus 72, the coded image data are sent to the video decoder 67 and the audio data to the audio codec 70.

The video decoder 67 reproduces dynamic image data by decoding the coded image data using a predetermined decoding method such as MPEG2 or MPEG4. The reproduced dynamic image data are supplied to the LCD 35 through the LCD control unit 66. The steps above allow the mobile telephone 1 to display dynamic image data acquired from the dynamic image file linked to the simple-format website.

At the same time, the audio codec 70 converts the audio data to an analog audio signal before sending the signal to the speaker 34. This enables the mobile telephone 1 to reproduce the audio data acquired from the dynamic image file linked to the simple-format website.

As in the case of e-mail, given the user's suitable operation, the mobile telephone 1 may have the read/write unit 73 write into the memory card 51 the received data from linked simple-format websites.

Figure 6:
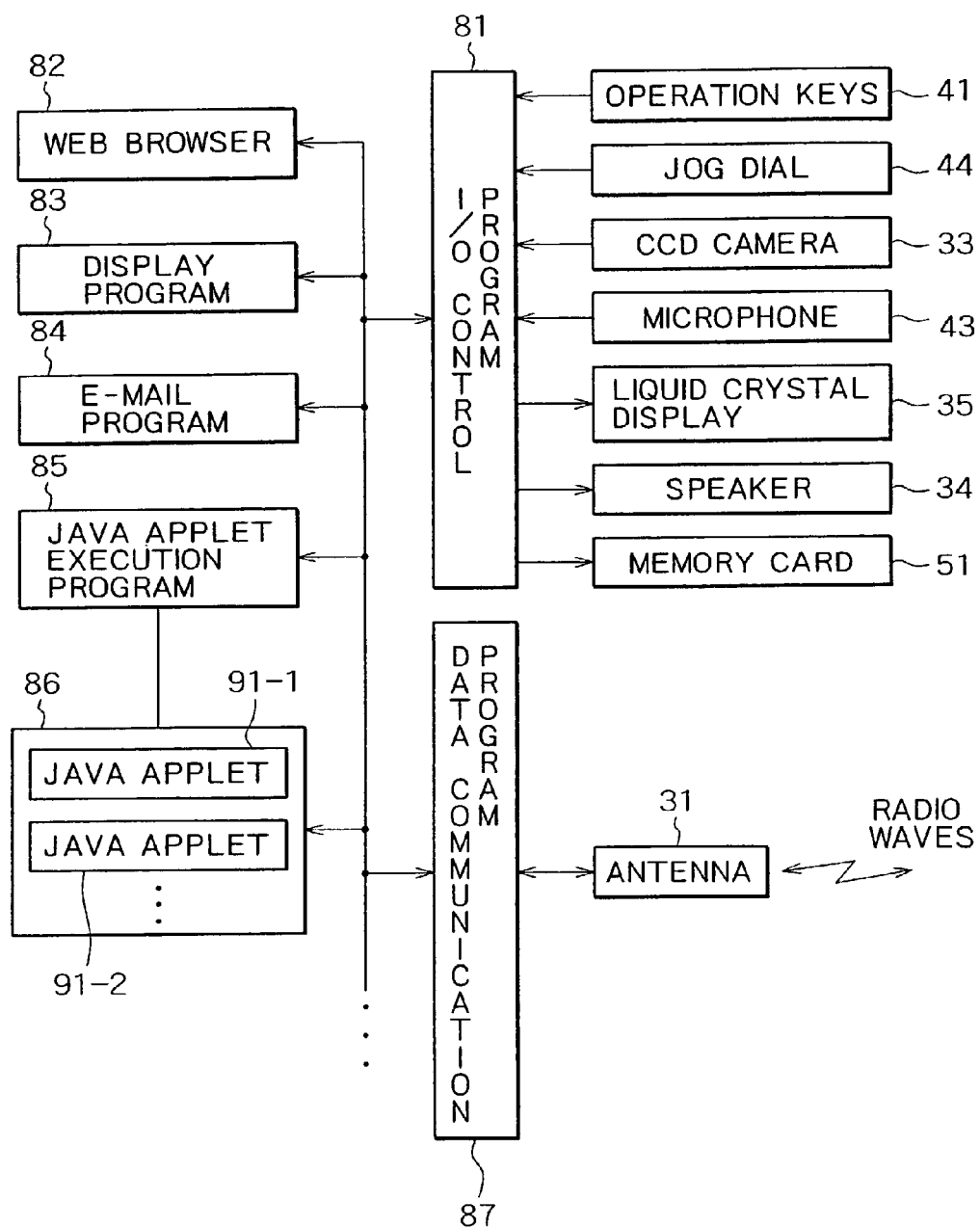
FIG. 6 is a block diagram outlining functions of the mobile telephone.

FIG. 6 is a block diagram outlining functions of the mobile telephone 1. An I/O control program 81 controls diverse processes: supplying a relevant application program with signals representing the operations or instructions made or entered by the user manipulating the operation keys 41 and jog dial 44; reproducing sound by sending to the speaker 34 the user's voice and other data input through the microphone 43 in accordance with the processing of various application programs; outputting image data taken by the CCD camera 33 to the LCD 35 for image display; writing desired data into the memory card 51; and outputting relevant data through a data communication program 87 to the antenna 31 for transmission in the form of radio waves.

A Web browser 82 is a software program used on the client side to browse information offered by the WWW server 9. Based on a predetermined communication protocol, the Web browser 82 provides communication between the WWW server 9 and its WWW clients. The Web browser 82 further supports extended language (e.g., Java (registered trademark)) features that offer security functions, reproduce multimedia data such as sound and dynamic image data, and transfer programs between the WWW server 9 and the WWW clients.

Using the I/O control program 81, a display program 83 converts or otherwise processes image data retrieved from the memory card 51 or taken by the CCD camera 33. The processed data are displayed on the LCD 35 under control of the program 81.

An e-mail program 84 requests the Internet service provider 6 to forward e-mails addressed to the program 84 and to let the program 84 download these e-mails. The e-mail program 84 further requests the Internet service provider 6 to send e-mails to specific destinations.

A Java (registered trademark) applet execution program 85 is a program that gains access to the CyberCode authentication site 8 to register necessary user IDs or download relevant Java applets.

The Java applet execution program 85 further executes Java applets 91-1 and 91-2 that may be selected by the user from among the applets downloaded from the CyberCode authentication site 8 and held in the memory 86. For example, as will be described later, executing a Java applet called the CyberCode generation program creates a CyberCode for authentication purposes (i.e., cyber-ticket for authentication). The CyberCode thus created is displayed on the LCD 35.

If an application program (e.g., Web browser 82) being executed by the main control unit 61 communicates information with another apparatus via the antenna 31, the data communication program 87 controls the communication process of the application program.

Figure 8:
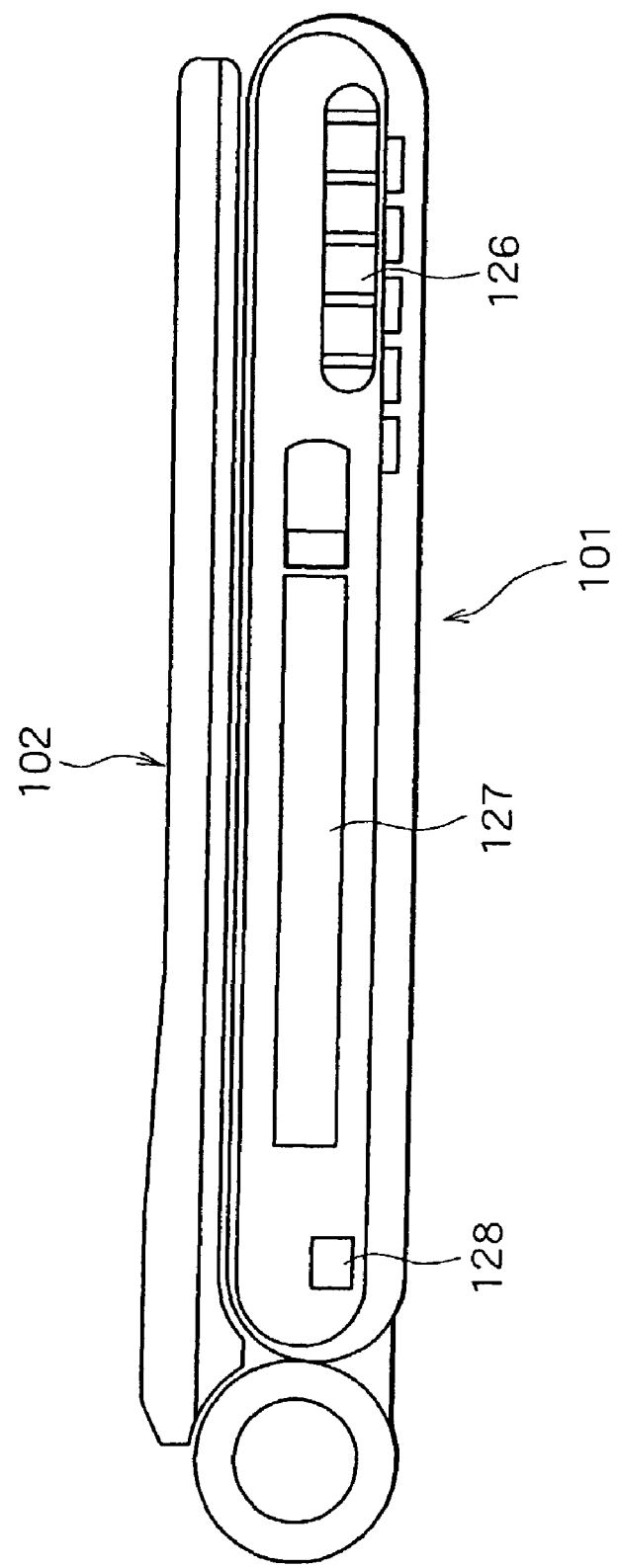
FIG. 8 is a left-hand side view of the ticketless terminal of FIG. 7 with its display unit folded shut.
Figure 9:
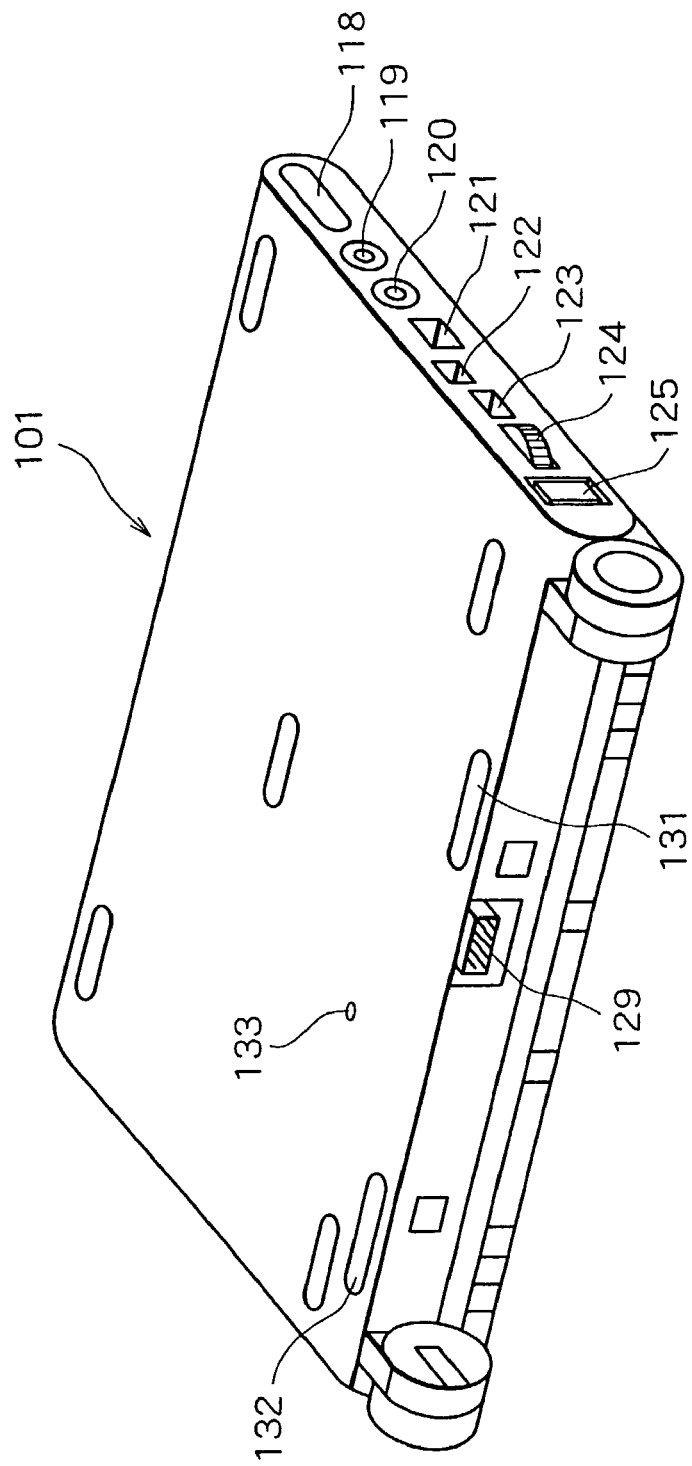
FIG. 9 is a rear view of the ticketless terminal of FIG. 7 with its display unit folded shut.

FIGS. 7, 8 and, 9 outline a typical structure of the ticketless terminal 3. The ticketless terminal 3 is basically made up of a body 101 and a display unit 102 that is attached swingingly to the body 101.

On its surface, the body 101 includes: operation keys 103 used to enter alphanumeric characters and symbols; a stick-type pointing device 104 (simply called the stick hereunder where appropriate) used to move a mouse cursor; a left-click button 104A and a right-click button 104B corresponding to the left and right buttons of a regular mouse respectively; a center button 104C for operating a scroll bar without positioning the mouse cursor to a scroll button; built-in speakers 105A and 105B; a depressible power switch 106; a shutter button 108 for use with a CCD camera 107 furnished in the display unit 102; and a power lamp PL, a battery lamp BL, and a message lamp ML, each composed of a light-emitting diode (LED).

On the front of the display unit 102 is a liquid crystal display (LCD) 109 composed illustratively of TFT (Thin Film Transistor) color liquid crystal elements. At the top center of the LCD 109 is an image pickup unit 111 equipped with the CCD camera 107. The image pickup unit 111, mounted rotatably on the display unit 102, may be positioned anywhere within a 180-degree range between two extreme positions: one is where the image pickup unit 111 faces the same direction as the display unit 102, and the other position is where the image pickup unit 111 faces the opposite direction of the display unit 102. An adjusting ring 112 permits focus adjustment of the image pickup unit 111.

The display unit 102 is furnished with a microphone 113 across the front to the rear side near the leftmost position of the image pickup unit 111. The microphone 113 picks up sound extensively on both the front and the rear side of the display unit 102.

Pawls 114 and 115 are located near the leftmost and rightmost positions of the liquid crystal display 109. Those locations on the body 101 which correspond to the pawls 114 and 115 have holes 116 and 117 respectively. When the display unit 102 is swung shut onto the body 101, the pawls 114 and 115 engage with the corresponding holes 116 and 117.

When the front edge of the display unit 102 is lifted from the body 101 out of the folded state, the pawls 114 and 115 are released from the corresponding holes 116 and 117. The disengagement of the pawls allows the display unit 102 to be swung open away from the body 101.

The right-hand edge of the body 101 includes: an infrared port 118 based on IrDA (Infrared Data Association) standards, a headphone terminal 119, a microphone input terminal 120, a USB (Universal Serial Bus) terminal 121, an external power connector 122, an external display output connector 123; a jog dial 124 which, when rotated and pushed in, inputs instructions for executing specific processes; and a modem terminal 125 for use by a modular jack.

The left-hand edge of the body 101 includes: an exhaust port 126, a PC card slot 127 for accommodating a PC (Personal Computer) card complying with PCMCIA (Personal Computer Memory Card International Association) standards, and a four-pin type IEEE (Institute of Electrical and Electronics Engineers) 1394 terminal 128.

The rear edge of the body 101 includes a battery connector 129. The bottom of the body 101 is furnished with a slide lever 131 for removing a battery pack 130, a lock lever 132 for locking the sliding operation of the slide lever 131, and a reset switch 133 that may be operated to terminate the operation of the body 101 and to restore the environment in effect when power was initially applied. The battery pack 130 is attached removably to the battery connector 129.

Figure 10:
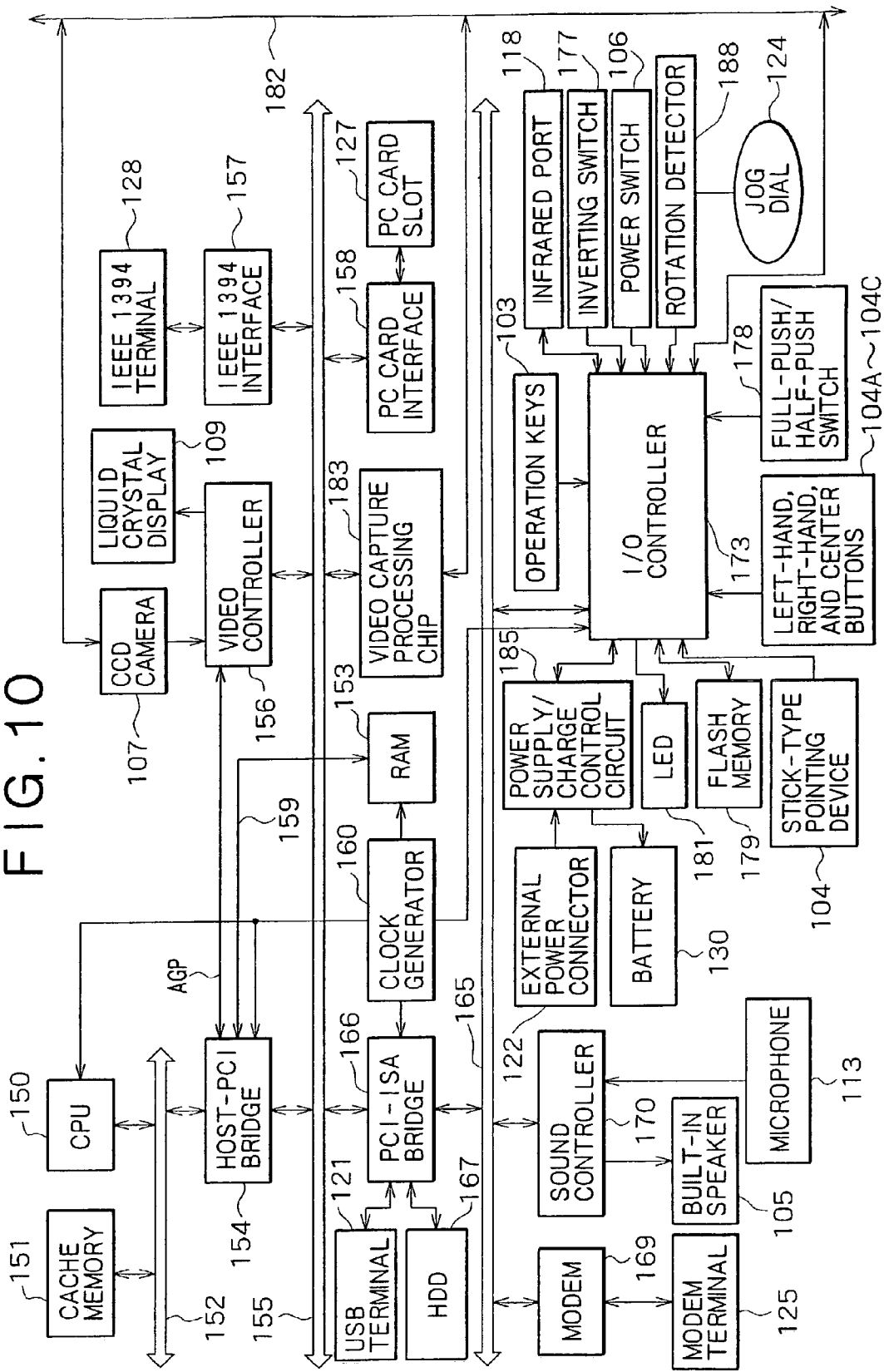
FIG. 10 is a block diagram depicting a typical internal structure of the ticketless terminal.

FIG. 10 is a block diagram depicting a typical internal structure of the ticketless terminal 3. A CPU 150 providing overall control of diverse functions of the body 101 is connected to a host bus 152. These functions are implemented by the CPU 150 loading various programs and applications into a RAM 153 and carrying out these programs at predetermined speeds based on a system clock signal from a clock generator 160. The host bus 152 is connected with a cache memory 151. Data cached in the cache memory 151 are used by the CPU 150 in high-speed access operations.

The host bus 152 is connected to a PCI (Peripheral Component Interconnect) bus 155 via a host-PCI bridge 154. The PCI bus 155 is in turn connected to a video controller 156, an IEEE 1394 interface 157, a video capture processing chip 183, and a PC card interface 158.

The host-PCI bridge 154 controls exchanges of data between the CPU 150 on the one hand, and the video controller 156, video capture processing chip 183, IEEE 1394 interface 157, and PC card interface 158 on the other hand. Furthermore, the host-PCI bridge 154 controls the RAM 153 connected via the memory bus 159.

The host-PCI bridge 154 is connected to the video controller 156 via a signal line complying with AGP (Accelerated Graphics Port) standards. The connection permits high-speed transfer of image data between the host-PCI bridge 154 and the video controller 156.

The video capture processing chip 183 is connected to a serial bus 182. Given image data taken by the CCD camera 107 and fed over the serial bus 182, the video capture processing chip 183 places the data temporarily into an internal frame memory (not shown) before subjecting the data to an image compression process based on JPEG (Joint Photographic Experts Group) standards. The compression process creates JPEG image data that are again placed into the frame memory.

On request by the CPU 150, the video capture processing chip 183 transfers JPEG image data from the frame memory to the RAM 153 using a bus master function. From the RAM 153, the JPEG image data are further transferred to a hard disc drive (HDD) 167.

The video controller 156 receives image data successively from various application programs as well as image data taken by the CCD camera 107. The received image data are output to the LCD 109 of the display unit 102 so that a plurality of window screens may be displayed.

The IEEE 1394 interface 157 is coupled directly to the IEEE 1394 terminal 128. It is through the IEEE 1394 terminal 128 that the IEEE 1394 interface 157 connects to another apparatus and to external devices such as a digital video camera.

The PC card interface 158 is connected to a PC card (not shown) that may be attached to the card slit 127 when an optional function needs to be added. The PC card allows the PC card interface 158 to connect to a drive in which a magnetic disc, an optical disc, a magneto-optical disc, or a semiconductor memory may be loaded as needed.

The PCI bus 155 is connected to an ISA (Industrial Standard Architecture) bus 165 via a PCI-ISA bridge 166. The PCI-ISA bridge 165 is in turn connected to the HDD 167 and USB terminal 121.

The PCI-ISA bridge 166 is made up of an IDE (Intelligent Drive Electronics) interface, a configuration register, an RTC (Real Time Clock) circuit and a USB interface. As such, the PCI-ISA bridge 166 causes the IDE interface to control the HDD 167 on the basis of the system clock signal from the clock generator 160.

The hard disc in the HDD 167 contains an operating system (OS, such as Windows (registered trademark) 98), an e-mail program, an auto-pilot program, a jog dial server program, a jog dial driver, capture software, and other application programs. During boot-up, these programs are successively started, transferred, and loaded into the RAM 153.

The PCI-ISA bridge 166 controls through USB interfaces such external devices as a flexible disc drive, a printer, and a USB mouse (not shown) which are connected via the USB terminal 121. The PCI-ISA bridge 166 further controls a modem 169 and a sound controller 170 which may be connected to the ISA bus 165.

The modem 169 connects to the Internet service provider 6 through the modem terminal 125 over the public switched network 5. Through the Internet service provider 6, the modem 169 establishes a dial-up IP (Internet Protocol) connection with the Internet 7.

The sound controller 170 generates audio data by converting a sound signal picked up by the microphone 113 into digital format. The digital audio data thus generated are output to the CPU 150. The sound controller 170 further generates an audio signal by converting audio data from the CPU 150 into analog format. The analog audio data thus generated are output to the outside through the built-in speakers 105.

The ISA bus 165 is connected to an I/O (Input/Output) controller 173. The I/O controller 173 is supplied with power from an external power connector 122 via a power supply/charge control circuit 185. When the power switch 106 is turned on, the I/O controller 173 feeds power to the circuits involved. As with other components, the I/O controller 173 functions in keeping with the system clock signal from the clock generator 160.

Under control of the I/O controller 173, the power supply/charge control circuit 185 controls charging of the battery pack 130 attached to the battery connector 129.

The I/O controller 173 is constituted by a microcontroller, an I/O interface, a CPU, a ROM and a RAM. Based on a BIOS (Basic Input/Output System) held in a flash memory 179, the I/O controller 173 controls the input and output of data between the OS and application software on the one hand, and various peripheral devices such as the LCD 109 and HDD 167 on the other hand. The I/O controller 173 is further connected with the infrared port 118 to perform infrared communication illustratively with other devices.

The I/O controller 173 is also connected to an inverting switch 177. The inverting switch 177 is turned on when the image pickup unit 111 is rotated 180 degrees in the backward direction of the LCD 109. When that inverting rotation happens, the I/O controller 173 reports the inversion to the CPU 150 via the PCI-ISA bridge 166 and host-PCI bridge 154.

In addition, the I/O controller 173 is connected to a full-push/half-push switch 178. When the shutter button 108 on the top of the body 101 is half-pushed, the action brings the full-push/half-push switch 178 into a half-pushed state that is reported by the I/O controller 173 to the CPU 150. When the shutter button 108 is fully pushed, that action brings the switch 178 into a fully pushed state that is reported by the I/O controller 173 to the CPU 150. Specifically, with the capture software loaded from the HDD 167 into the RAM 153, the CPU 150 enters still image mode when the user half-pushes the shutter button 108. In still image mode, the CPU 150 causes the CCD camera 107 to freeze the image being taken. When the user fully pushes the shutter button 108, the CPU 150 causes the frozen image data to be captured and output to the video controller 156.

Where the capture software is not active, fully pushing the shutter button 108 causes the CPU 150 to enter dynamic image mode. In this mode, the CPU 150 causes a dynamic image to be captured for up to about 60 seconds and output to the video controller 156.

The ROM of the I/O controller 173 contains a wake-up program, a key input monitoring program, an LED control program, a jog dial status monitoring program, and other control programs.

The jog dial status monitoring program, used in conjunction with the jog dial server program held on the hard disc of the HDD 167, checks to see if the jog dial 124 is rotated or pushed.

The wake-up program causes the CPU 150 to execute a specific process when the current time fed from the RTC circuit in the PCI-ISA bridge 166 reaches a predetermined start time. The key input monitoring program monitors input from the operation keys 103 and other key switches. The LED control program controls the illumination of such lamps as the power lamp PL, battery lamp BL, and message lamp ML.

The RAM of the I/O controller 173 is furnished with diverse registers: an I/O register for use by the jog dial status monitoring program, a set time register for the wake-up program, a key input register for the key input monitoring program, an LED control register for the LED control program, and registers for other programs.

The set time register accommodates start time information that may be set as desired by the user for use with the wake-up program. The I/O controller 173 causes the wake-up program to determine whether the current time supplied from the RTC circuit has reached the start time set by the user. When there is a match between the current time and the set start time, the match is reported to the CPU 150. In response, the CPU 150 starts a predetermined application program preset for the start time and performs a relevant process using the application program in question.

The key input monitoring register accommodates operation key flags that are set in response to input operations of the operation keys 103, stick 104, left-click button 104A, right-click button 104B, and center button 104C.

Using the key input monitoring program, the I/O controller 173 checks the operation key flags to see whether the stick 104 is operated for a pointing operation and whether the left-click button 104A, right-click button 104B, or center button 104C is clicked or operated. The pointing or click operation, if detected, is reported to the CPU 150.

The pointing operation above refers to an action exerted on the stick 104 by fingertips so as to move the mouse cursor to a desired position on the screen. The click operation signifies a quick, fingertip-activated push on the left-click button 104A or right-click button 104B followed by an immediate release of the button. The operations above cause the CPU 150 to move the mouse cursor or perform a click-designated process in a way reflecting the user's intentions.

The LED control register accommodates illumination flags indicative of the illuminated states of such lamps as the power lamp PL, battery lamp BL, and message lamp ML.

Illustratively, a push by the user on the jog dial 124 may cause the CPU 150 to start the e-mail program from the hard disc of the HDD 167 so that the e-mail program may then receive an e-mail. Upon receipt of an e-mail, the I/O controller 173 sets an illumination flag and accordingly illuminates the message lamp ML by turning on its LED 181.

The I/O register for use by the jog dial status monitoring program accommodates two flags: a rotating operation flag and a pushing operation flag, which are set in response to a rotating and a pushing operation of the jog dial 124 respectively.

The user may select any one of a plurality of displayed menu items by rotating and pushing the jog dial 124 connected to the I/O controller 173 through a rotation detector 188. If the selection occurs, the I/O controller 173 sets the rotating operation flag and pushing operation flag in the I/O register and notifies the CPU 150 of the settings.

In accordance with the jog dial server program loaded into the RAM 153 from the HDD 167, the CPU 150 activates an application program that corresponds to the menu item highlighted and selected by rotating and pushing the jog dial 124. Using the application program, the CPU 150 performs the process relevant to the selected menu item.

Even if the power switch 106 is turned off and the OS is inactive, the I/O controller 173 stays operative under control of the power supply/charge control circuit 185. That means a push on the jog dial 124 in a power-saving state or a power-off state can still activate a user-designated application program or script file without recourse to a dedicated key.

The I/O controller 173 is also connected to the serial bus 182. Over the serial bus 182, the I/O controller 173 is supplied with various parameters set on the CCD camera 107 by use of the operation keys 103 or jog dial 124. The parameters thus established allow the I/O controller 173 to adjust the brightness and contrast of the CCD camera 107.

Figure 11:
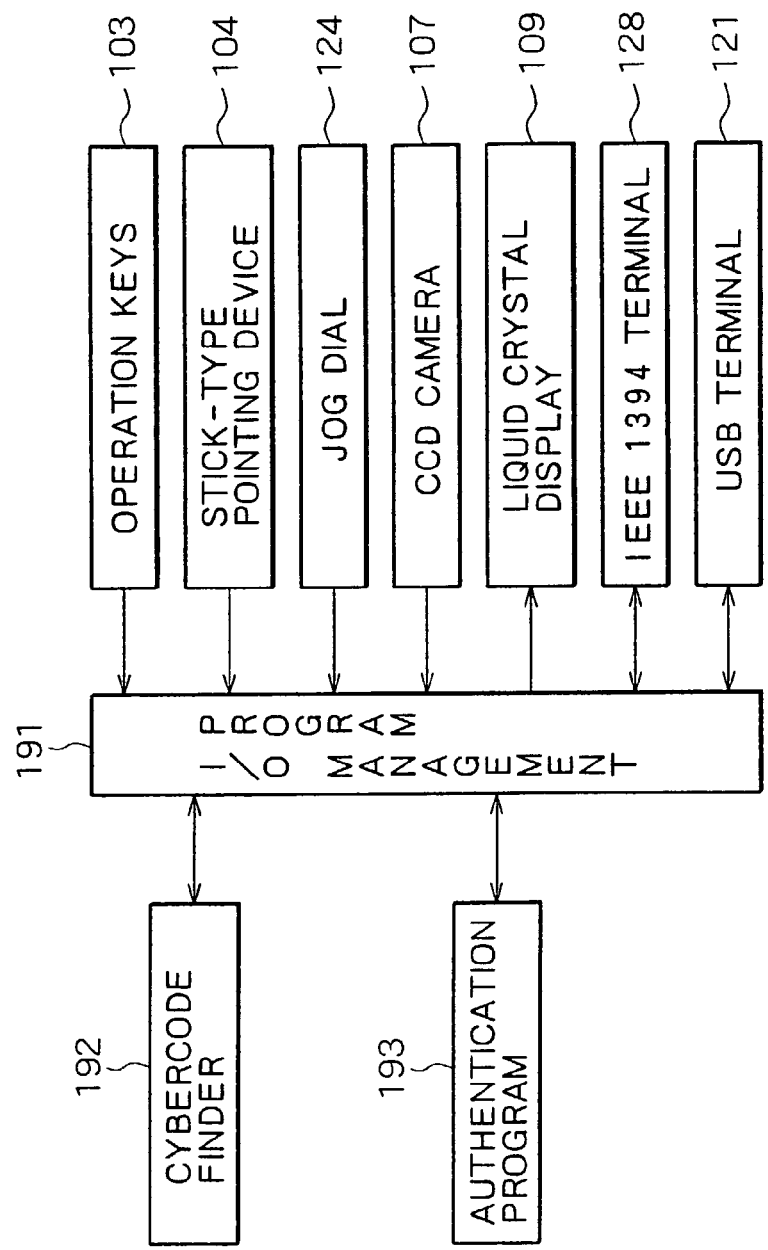
FIG. 11 is a block diagram indicating functions of the ticketless terminal.

FIG. 11 is a block diagram outlining functions of the ticketless terminal 3. An I/O management program 191 manages the following processes: supplying relevant application programs with signals representing the operations or instructions performed or entered by the user manipulating the operation keys 103, stick-type pointing device 104 or jog dial 124; outputting data to the IEEE 1394 terminal 128 or USB terminal 121 based on the processing of application programs so that the data may be transmitted to another apparatus from the terminal; and outputting image data taken by the CCD camera 107 to the LCD 109 for image display thereon.

A CyberCode (registered trademark) finder 192 is a program that performs the following processes: receiving, under control of the I/O management program 191, signals representing the user's operations or signals denoting commands from another apparatus so as to display a screen reflecting the received signals on the LCD 109; executing an image pickup process using the CCD camera 107 in conjunction with the displayed screen; and performing the process of recognizing a code number of the CyberCode from the picked-up image.

An authentication program 193 gains access to the CyberCode authentication site 8 through the IEEE 1394 terminal 128 or USB terminal 121 based on the CyberCode number recognized by the processing of the CyberCode finder 192, in order to request user authentication. An outcome of authentication by the CyberCode authentication site 8 is displayed on the LCD 109 by the authentication program 193.

Figure 12:
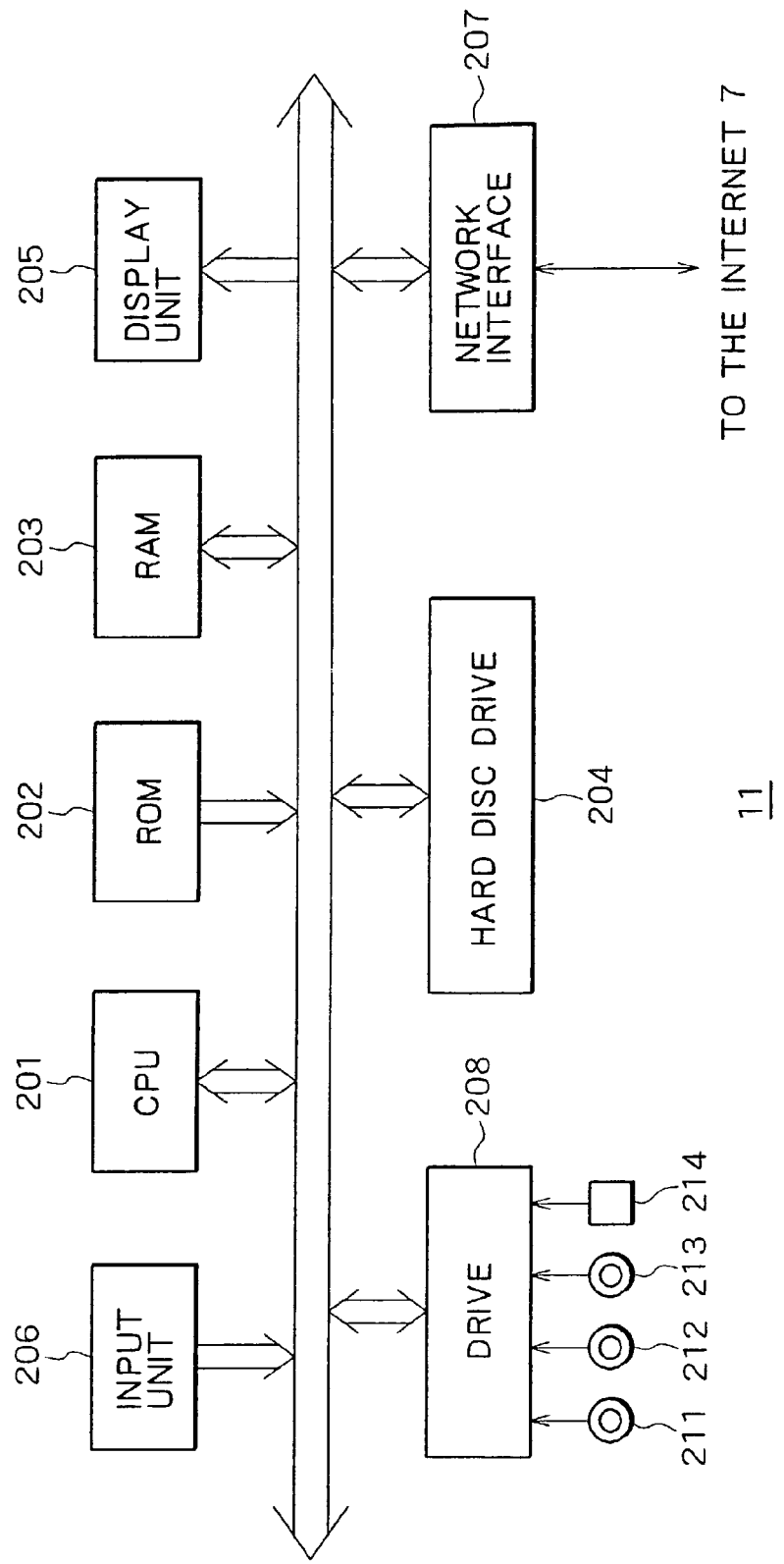
FIG. 12 is a block diagram illustrating a typical internal structure of a CyberCode generation program issuing/authenticating server.

FIG. 12 is a block diagram illustrating a typical electrical structure inside the CyberCode generation program issuing/authenticating server 11. A CPU 201 performs various processes in accordance with programs stored in a ROM 202 or on a hard disc drive 204. The ROM 202 retains various data in addition to programs that are activated during boot-up. A RAM 203 holds data and programs needed by the CPU 201 in performing its processes. The hard disc drive 204 stores a server program causing the CyberCode generation program issuing/authenticating server 11 to function as a server, as well as various programs that will be discussed later with reference to FIG. 13.

A display unit 205, constituted illustratively by an LCD or a CRT (cathode ray tube), displays images representing image data fed from the CPU 201. An input unit 206 is illustratively made up of a keyboard, buttons, switches, and/or a mouse. The input unit 206 is manipulated by the administrator of the CyberCode generation program issuing/authenticating server 11 for the input of diverse commands to the CPU 201.

Connected to the Internet 7, a network interface 207 receives IP packets addressed to the CyberCode generation program issuing/authenticating server 11. Furthermore, in keeping with the Internet protocol, the network interface 207 generates IP packets out of the data from the CPU 201 and outputs the generated packets onto the Internet 7.

A drive 208 is loaded with a magnetic disc 211, an optical disc 212, a magneto-optical disc 213, or a semiconductor memory 214 as needed. The drive 208 allows programs to be installed from the loaded disc or memory for execution by the CPU 201.

Figure 13:
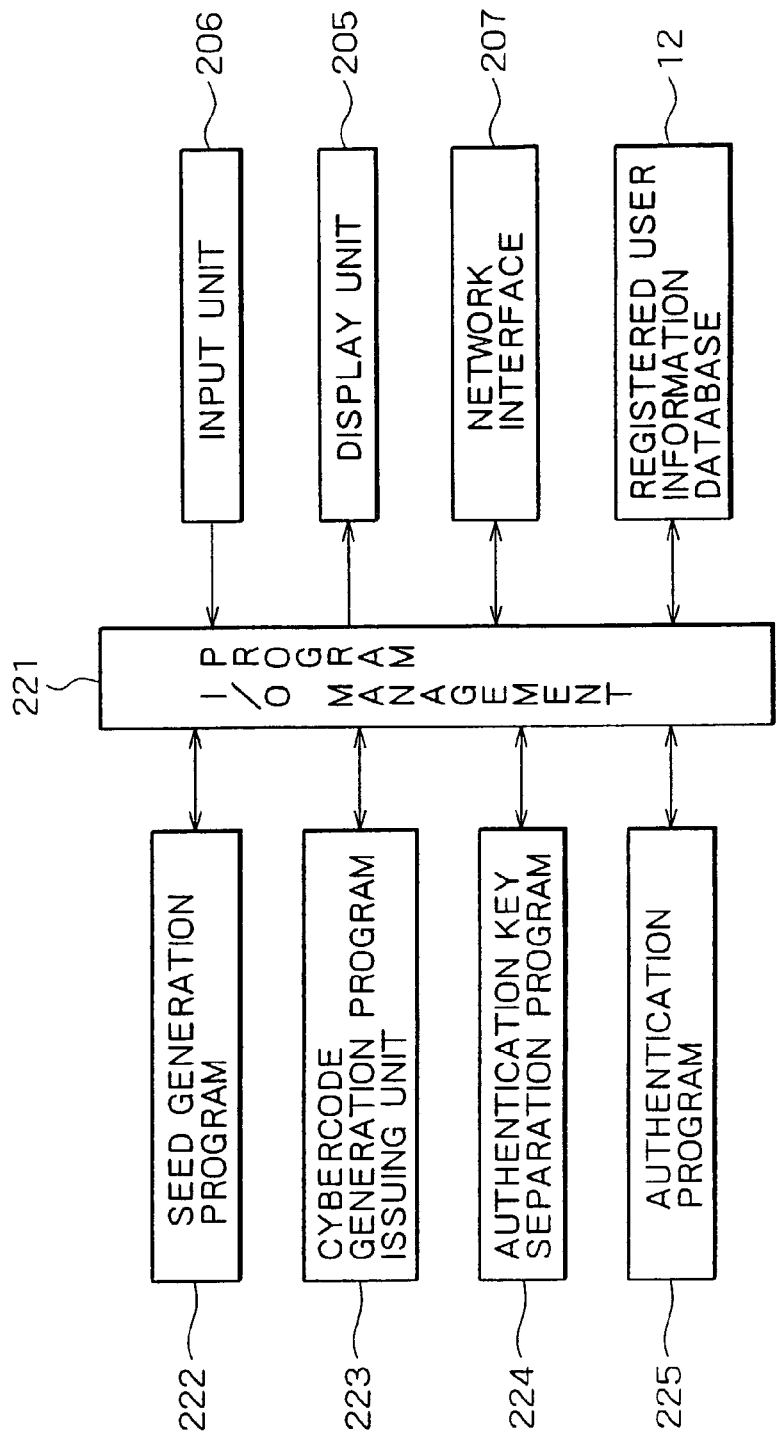
FIG. 13 is a block diagram outlining functions of the CyberCode generation program issuing/authenticating server.

FIG. 13 is a block diagram outlining functions of the CyberCode generation program issuing/authenticating server 11. An I/O management program 221 performs the following processes: supplying relevant application programs with signals denoting the operations or instructions performed or input by the user manipulating the input unit 206 or with signals entered through the network interface 207; outputting data to the network interface 207 based on the processes by various application programs so as to transmit the data to another apparatus; and outputting image data to the display unit 205 for image display thereon.

Under control of the I/O management program 221, a seed generation program 222 receives a signal corresponding to a command (i.e., a request to issue the CyberCode generation program) from another apparatus. Given the signal, the seed generation program 222 generates (issues) a user ID accordingly and creates a seed ID for random number generation according to the following expression:

$$\text{Seed ID}=f(\text{UID}, \text{TID}) \quad (1)$$

where, UID denotes a unique user ID assigned to each user of the mobile telephone 1, and TID represents the time of day at which the request to issue the CyberCode generation program is received (i.e., CyberCode generation program issue start time). The seed ID thus created for random number generation is used to create a CyberCode generation program, as will be described later.

Random numbers refer generally to numbers extracted haphazardly from a set of numbers. There are true random numbers, physical random numbers, and pseudo random numbers.

For true random numbers in the form of bit strings, 0's and 1's occur with equal probability. That is, each bit is independently and identically distributed (idd) with regard to other bits.

Physical random numbers are numbers generated randomly and amplified digitally through effects of quantum physics. When smoothed out to achieve a balance between 0's and 1's, these random numbers turn into true random numbers.

Pseudo random numbers are bit patterns computed on the basis of input bit patterns called seeds. These bit patterns are longer than seeds, appear to occur randomly. Because pseudo random numbers are generated by use of a deterministic algorithm, output random numbers are uniquely determined once a seed is decided on. This requires keeping the seed secret if it is to be used for encryption. The seed generation program 222 utilizes such pseudo random numbers. That is, the CyberCode generation program employs pseudo random numbers while the seed as the basis for random number generation is created by the seed generation program 222.

The seed generated by the seed generation program 222 will be referred to as either a seed ID for random number generation or a random number generation seed ID hereunder. It should be noted that the seed ID itself for random number generation is also regarded as a sort of random number that uniquely determines an output random number. In that respect, the random number as mentioned in this specification should be considered to signify the above-mentioned random numbers including the seed ID for random number generation.

Returning to FIG. 13, a CyberCode generation program issuing unit 223 under control of the I/O management program 221 receives a signal representing a command (i.e., request to issue the CyberCode generation program) from another apparatus. In response to the received signal and based on a random number generation seed ID generated by the seed generation program 222, on the user ID (UID) denoting the user of the requesting mobile telephone 1 and on the CyberCode generation program issue start time TID, the CyberCode generation program issuing unit 223 creates a CyberCode generation program PID (Java applet) such as P(UID, TID, seed ID) (t)

unique to each user.

Where the CyberCode generation program issuing/authenticating server 11 distributes to each user the CyberCode generation program PID having an algorithm unique to that user, the algorithm itself may be utilized as an authentication key.

The CyberCode generation program issuing unit 223 transmits the user-specific CyberCode generation program PID thus created to the requesting mobile telephone 1 through the Internet 7, Internet service provider 6, public switched network 5, and base station 2.

An authentication key separation program 224 under control of the I/O management program 221 receives a signal denoting a command (i.e., code number of the CyberCode generated by execution of the CyberCode generation program) sent from another apparatus, and separates a user ID from the code number represented by the received command. For example, of an eight-digit code number, low-order four digits may be separated as a user ID from the remaining four high-order digits.

An authentication program 225 under control of the I/O management program 221 may receive a signal denoting a command (i.e., code number of the CyberCode generated by execution of the CyberCode generation program) from the ticketless terminal 3 as well as the user ID acquired by the authentication key separation program 224. If the signal and user ID are received, the authentication program 225 searches the registered user information database 12 for an issue start time TID and a random number generation seed ID corresponding to the received user ID.

The authentication program 225 creates a CyberCode generation program PID based on the retrieved start time TID and random number generation seed ID, and carries out that program upon receipt of a code number. When a code number is obtained from the code pattern of the CyberCode generated by execution of the CyberCode generation program PID, the authentication program 225 compares that code number with the received code number. In case of a match between the two numbers, the authentication program 225 reports successful authentication to the ticketless terminal 3 through the I/O management program 221, network interface 207, and the Internet 7. In the case of a mismatch, unsuccessful authentication is reported through the same route.

Figure 14:
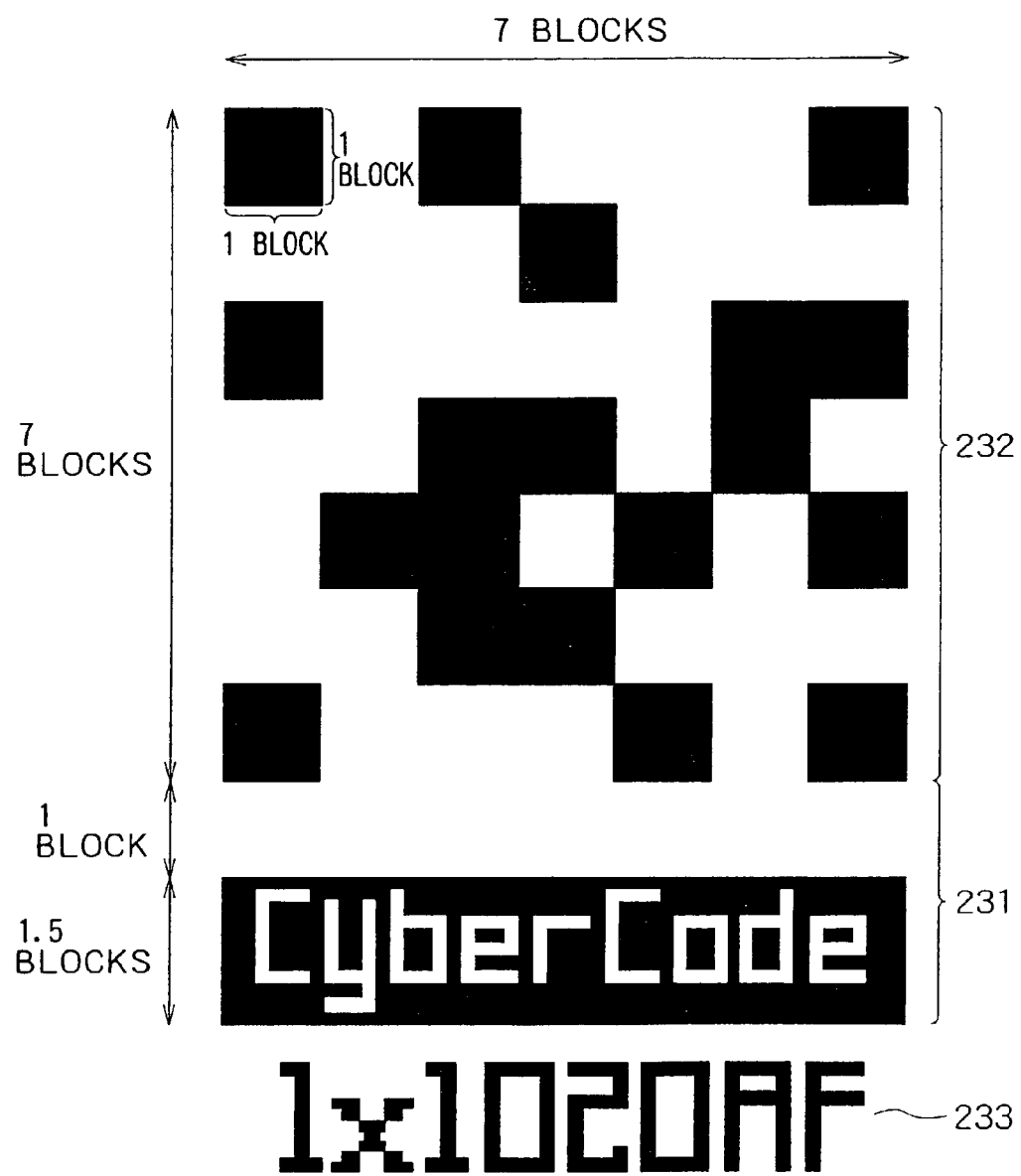
FIG. 14 is an explanatory view of a CyberCode.

The CyberCode for use with this invention will now be described by referring to FIG. 14. As shown in FIG. 14, a CyberCode is made up of a logo mark part 231 and a code part 232. If a single square cell is assumed to represent one block, then the combination of the logo mark part 231 with the code part 232 constitutes a rectangle occupying 9.5 blocks vertically and 7 blocks horizontally.

The logo mark part 231 shows a logo mark or alphanumeric characters legibly outlined against a colored background. In this example, the CyberCode system is identified by a human-readable mark expressing the significance of the system more or less clearly, such as "CyberCode" shown in hollowed fashion on a colored background.

The code part 232 has a total of 49 (7×7) blocks or cells arranged in a matrix structure. A single CyberCode may codify up to 24 bits of information. More specifically, of the entire 49 blocks, 16 blocks (i.e., 16 bits) made up of four corner blocks each surrounded by three blocks are not used to constitute data; of the remaining 33 blocks, 9 blocks (9 bits) make up check data by which to verify that the coded data in question are correct. As a result, the code part 232 constitutes a 24-bit code denoting a CyberCode identification number (code number).

Instead of the above-mentioned 49 blocks, the code part 232 may alternatively be composed of a total of 64 (8×8) blocks or cells. The composition makes it possible to codify more information.

An ID part 233 represents hexadecimally the 24-bit data coded in the code part 232. As such, the ID part 233 is not mandatory as part of the CyberCode.

More details of the CyberCode are disclosed illustratively in U.S. Pat. No. 6,325,287.

Figure 15:
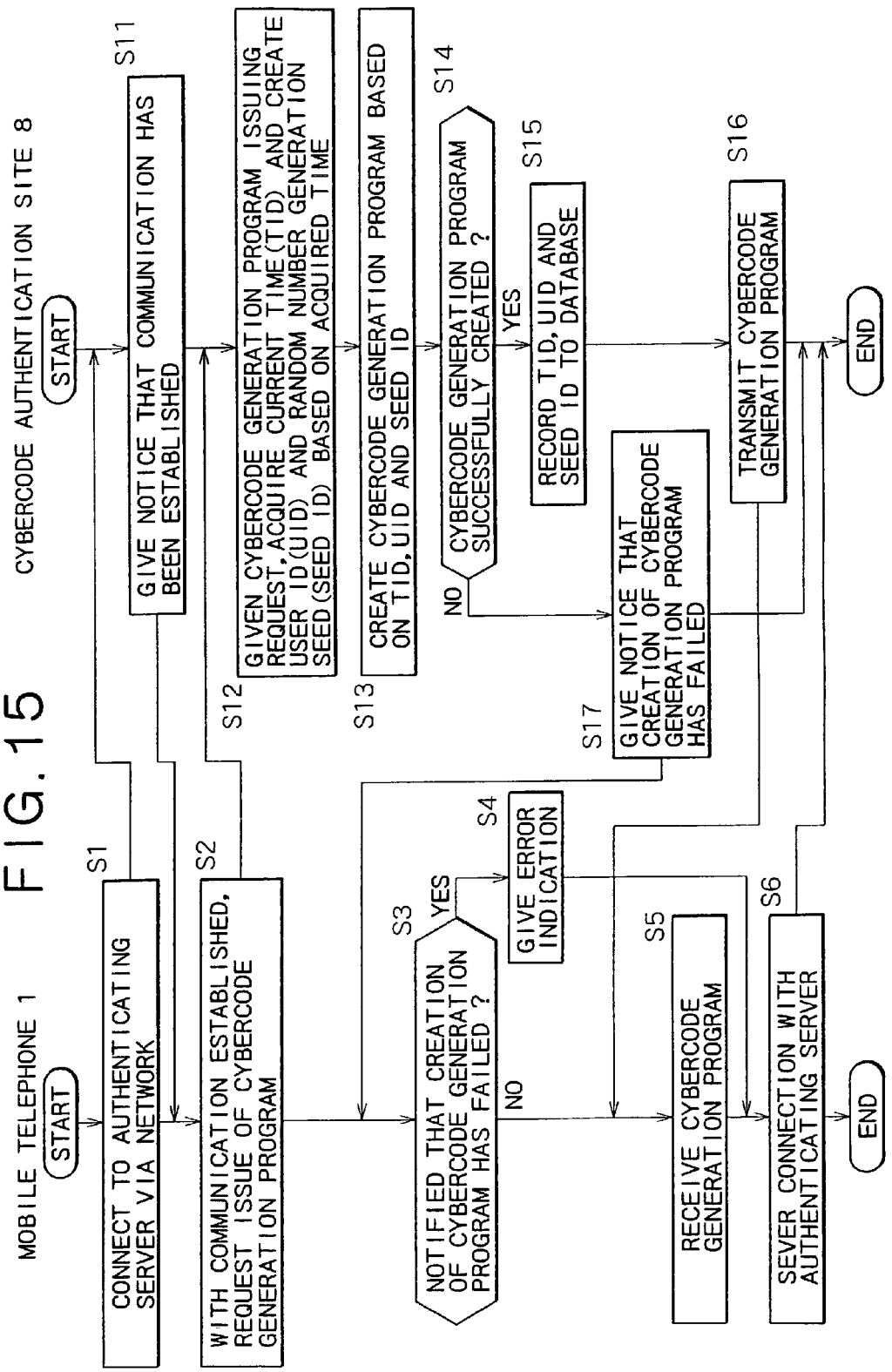
FIG. 15 is a flowchart of steps in which to download the CyberCode generation program.

Described below with reference to the flowchart of FIG. 15 is how the mobile telephone 1 gains access to the authentication site 8 and how it downloads from the site the CyberCode generation program to generate a CyberCode (authentication key) that substitutes for an admission ticket to the concert hall 4.

In step S1 of FIG. 15, the I/O control program 81 of the mobile telephone 1 supplies the display program 83 with a signal denoting the operation made by the user manipulating the operation keys 41 or jog dial 44. The supplied signal causes the display program 83 to display a menu screen such as one in FIG. 16 on the LCD 35.

Figure 16:
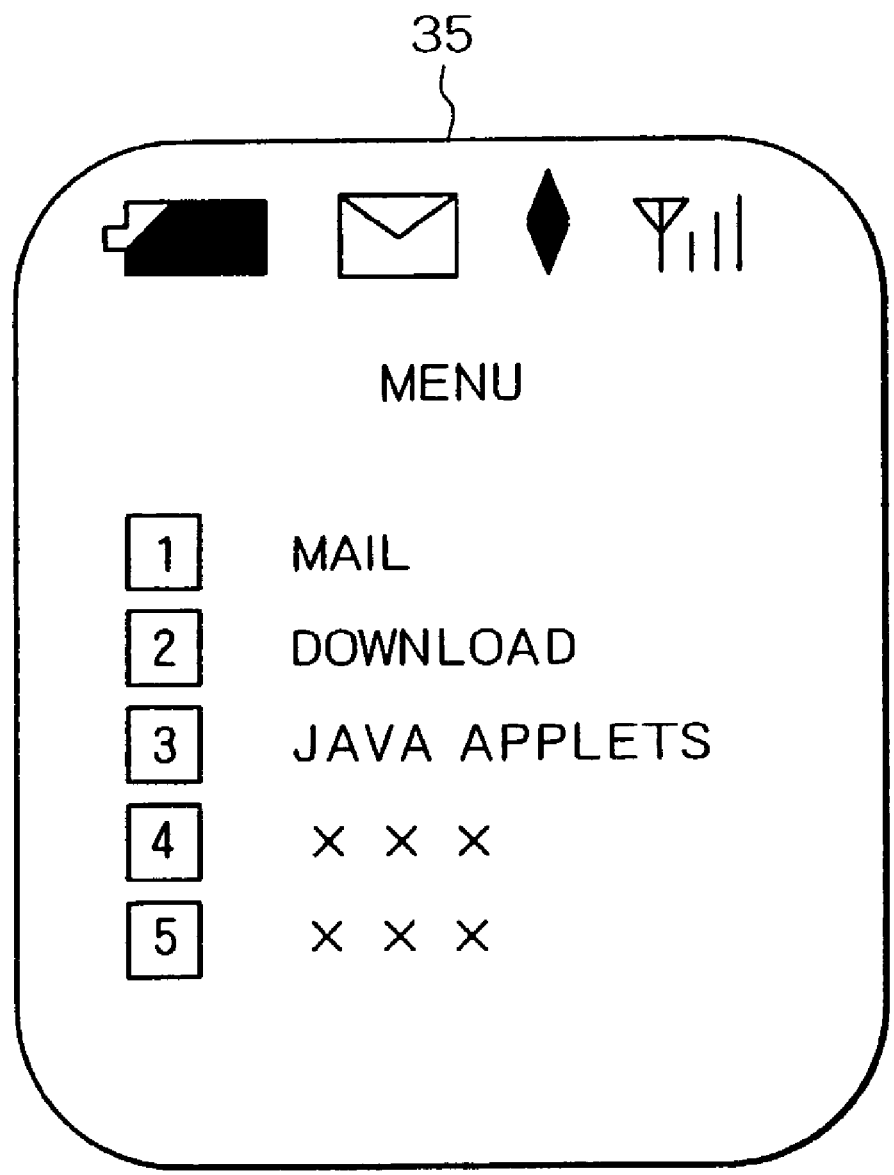
FIG. 16 is a schematic view of a menu screen that appears on a liquid crystal display of the mobile telephone.

The menu screen of FIG. 16 indicates such items as "Mail," "Download" and "Java applets," any of which may be selected by the user. If the user selects the item "Download" using the operation keys 41 or jog dial 44, then the I/O control program 81 feeds the Web browser 82 with a signal indicative of the operation performed by the user.

In turn, the Web browser 82 causes the data communication program 87 to communicate with the CyberCode generation program issuing/authenticating server 11 of the CyberCode authentication site 8 via the antenna 31, base station 2, public switched network 5, Internet service provider 6, and the Internet 7.

In step S11, the CyberCode generation program issuing/authenticating server 11 of the CyberCode authentication site 8 carries out an appropriate communication process and notifies the mobile telephone 1 that communication has been established. The notice is transmitted to the telephone 1 through the Internet 7, Internet service provider 6, public switched network 5, and base station 2. At this point, a compact HTML file corresponding to the top page of the server 11 is also transmitted to the mobile telephone 1.

In step S2, the data communication program 87 of the mobile telephone 1 is notified of the establishment of communication by the CyberCode generation program issuing/authenticating server 11 via the antenna 31. The received compact HTML file is supplied to the display program 83 so that a download screen (top page) such as one shown in FIG. 17 is displayed on the LCD 35.

Figure 17:
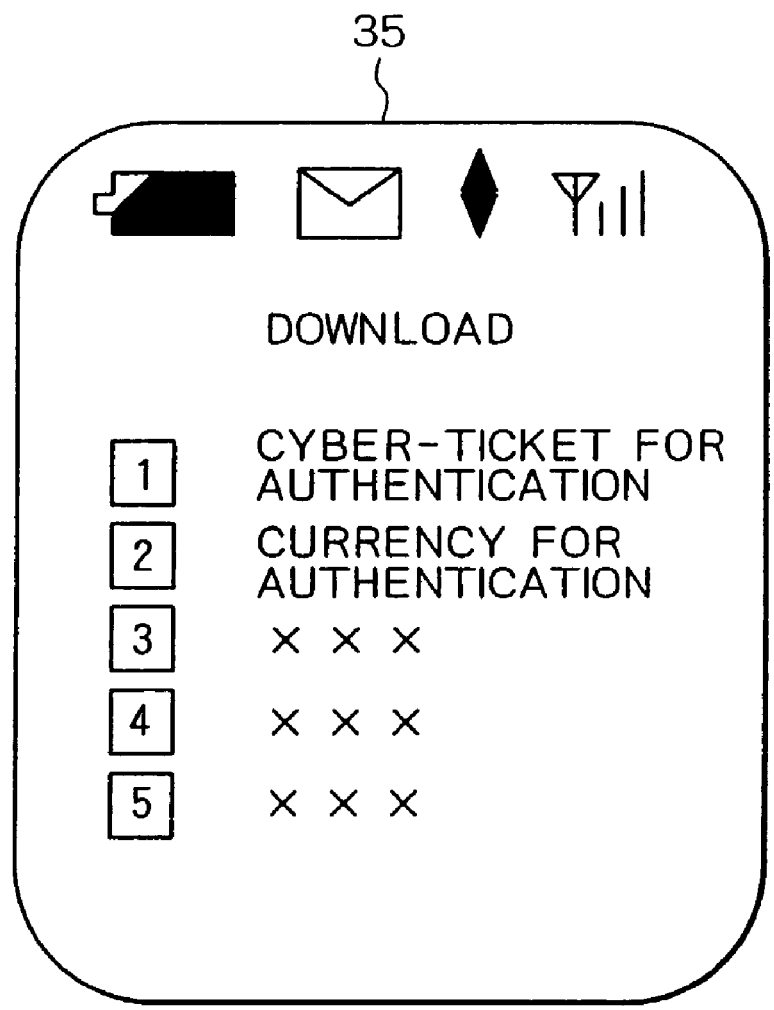
FIG. 17 is a schematic view of a download screen that appears on the liquid crystal display of the mobile telephone.

The download screen of FIG. 17 indicates such items as "Cyber-ticket for authentication" and "Currency for authentication," any of which may be selected by the user. If the user selects the item "Cyber-ticket for authentication" using the operation keys 41 or jog dial 44, then the I/O control program 81 supplies the Web browser 82 with a signal representing the operation carried out by the user.

The Web browser 82 causes the data communication program 87 to transmit the signal indicative of the user's operation to the CyberCode generation program issuing/authenticating server 11 of the CyberCode authentication site 8 via the antenna 31, base station 2, public switched network 5, Internet service provider 6, and the Internet 7. Under control of the Web browser 82, the data communication program 87 then receives the corresponding HTML file from the server 11 and feeds the received file to the display program 83.

Figure 18:
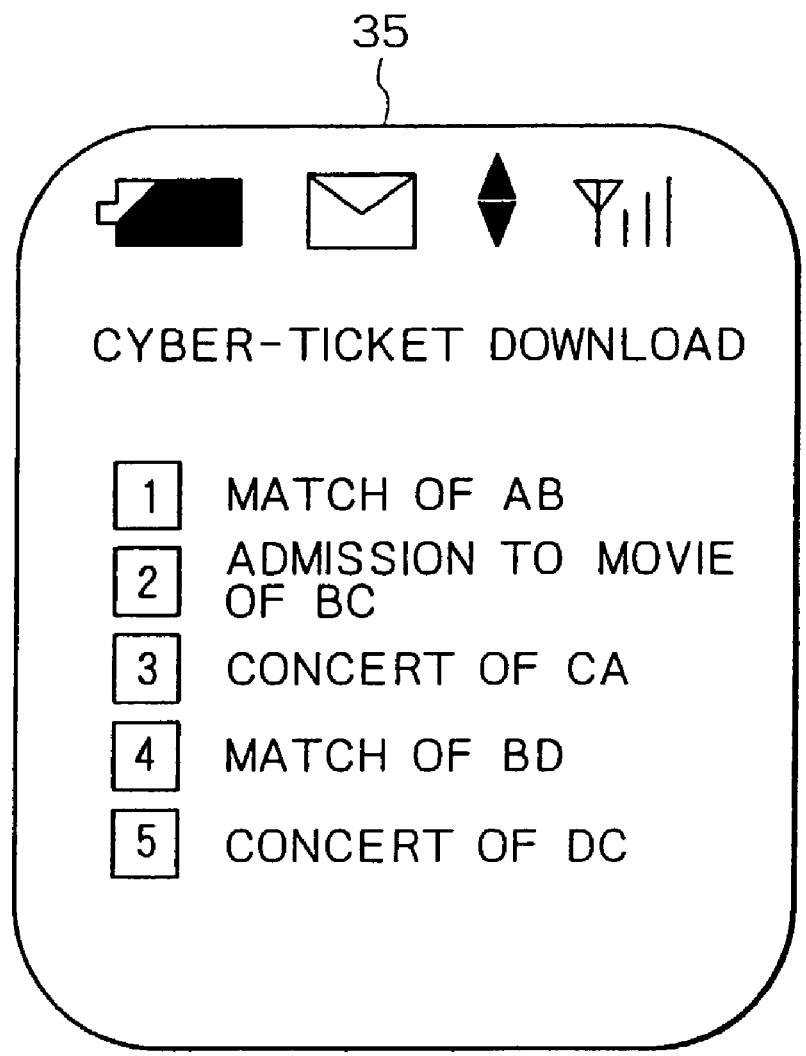
FIG. 18 is a schematic view of a cyber-ticket download screen that appears on the liquid crystal display of the mobile telephone.

Based on the HTML file thus supplied, the display program 83 causes the LCD 35 to display a cyber-ticket download screen such as one shown in FIG. 18. The cyber-ticket download screen of FIG. 18 shows such items as "Match of AB," "Admission to movie of BC," "Concert of CA," "Match of BD" and "Concert of DC," any of which may be selected (i.e., downloaded) by the user. If the user selects the item "Concert of CA" using the operation keys 41 or jog dial 44, then the I/O control program 81 supplies the Web browser 82 with a signal denoting the operation performed by the user.

Figure 19:
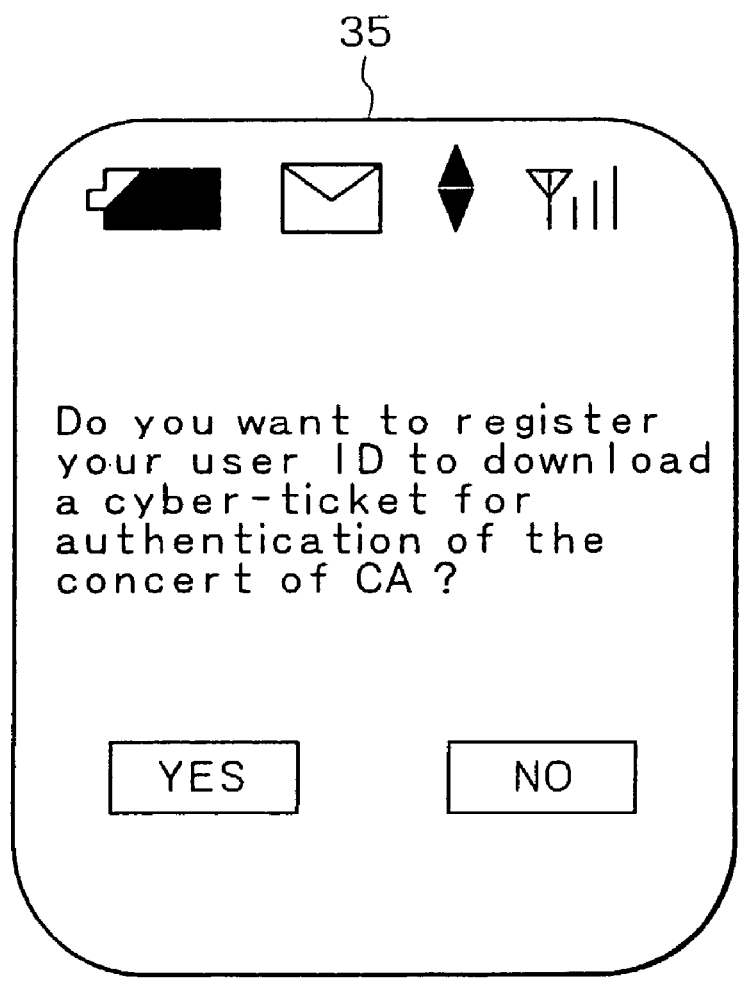
FIG. 19 is a schematic view of a user registration screen that appears on the liquid crystal display of the mobile telephone.

In turn, the Web browser 82 causes the display program 83 to display a user registration screen such as one in FIG. 19 on the LCD 35. The user registration screen of FIG. 19 shows a message such as: "Do you want to register your user ID to download a cyber-ticket for authentication of the concert of CA?" along with a "Yes" and a "No" item prompting the user's selection. If the user selects the item "Yes" using the operation keys 41 or jog dial 44, then the I/O control program 81 supplies the Web browser 82 with a signal representing the operation carried out by the user.

The Web browser 82 causes the data communication program 87 to transmit the signal denoting the user's operation to the CyberCode generation program issuing/authenticating server 11 of the CyberCode authentication site 8 via the antenna 31, base station 2, public switched network 5, Internet service provider 6, and the Internet 7. The transmitted signal serves to request the server 11 to issue the CyberCode generation program.

In step S12, the I/O management program 221 of the CyberCode generation program issuing/authenticating server 11 receives from the mobile telephone 1 the request to issue the CyberCode generation program through the network interface 207. The I/O management program 221 forwards the request signal to the seed generation program 222 causing the latter to generate a seed ID for random number generation.

The seed generation program 222 acquires a current time TID at which the request to issue the CyberCode generation program is received. In keeping with the time TID, the seed generation program 222 generates a user ID unique to each user. Then based on both the user ID thus generated and the time TID, the seed generation program 222 generates a seed ID for random number generation through the use of the expression (1) shown above.

In step S13, the CyberCode generation program issuing unit 223 generates the CyberCode generation program PID on the basis of the random number generation seed ID, user ID, and time TID obtained in step S12. The user ID is embedded into the low-order four digits of the code number (ID part 233) in the CyberCode that is generated by execution of the CyberCode generation program PID. That is, the user ID is included into the code number for use upon authentication.

In step S14, the CyberCode generation program issuing unit 223 checks to see whether the CyberCode generation program PID is successfully created. If in step S14 the program PID is judged to be successfully created, step S15 is reached. In step S15, the CyberCode generation program issue start time TID and random number generation seed ID are written to the registered user information database 12 in conjunction with the generated user ID.

In step S16, the CyberCode generation program issuing unit 223 transmits the CyberCode generation program PID created in step S13 to the mobile telephone 1 through the I/O management program 221, network interface 207, the Internet 7, Internet service provider 6, public switched network 5, and base station 2.

If in step S14 the CyberCode generation program PID is not judged to be successfully created due to a system error or other irregularities, then step S17 is reached. In step S17, the CyberCode generation program issuing unit 223 notifies the mobile telephone 1 of the failed attempt to create the CyberCode generation program via the I/O management program 221, network interface 207, the Internet 7, Internet service provider 6, public switched network 5, and base station 2.

In step S3, the data communication program 87 of the mobile telephone 1 checks to see whether a notice of the failed attempt to create the CyberCode generation program is received from the CyberCode generation program issuing/authenticating server 11 via the antenna 31. If that notice is judged received, step S4 is reached. In step S4, the data communication program 87 supplies the display program 83 with a signal representative of the received notice that creation of the CyberCode generation program has failed. Based on the supplied signal, the display program 83 causes the LCD 35 to display an error message such as: "Attempt to download the CyberCode generation program has failed."

If in step S3 the notice of the failed attempt to create the CyberCode generation program is not judged received, then step S5 is reached. In step S5, the data communication program 87 of the mobile telephone 1 receives the CyberCode generation program PID sent from the CyberCode generation program issuing/authenticating server 11 via the antenna 31. The CyberCode generation program PID thus received is recorded as a Java applet 91 to the memory 86.

In step S6 following step S4 or S5, the Web browser 82 causes the data communication program 87 to sever communication with the CyberCode generation program issuing/authenticating server 11, and terminates the processing.

The steps described above allow the user of the mobile telephone 1 to acquire a CyberCode generation program PID unique to that user. Executing the CyberCode generation program PID generates a CyberCode, as will be described later with reference to FIG. 20. The CyberCode thus generated serves as an authentication key.

Figure 20:
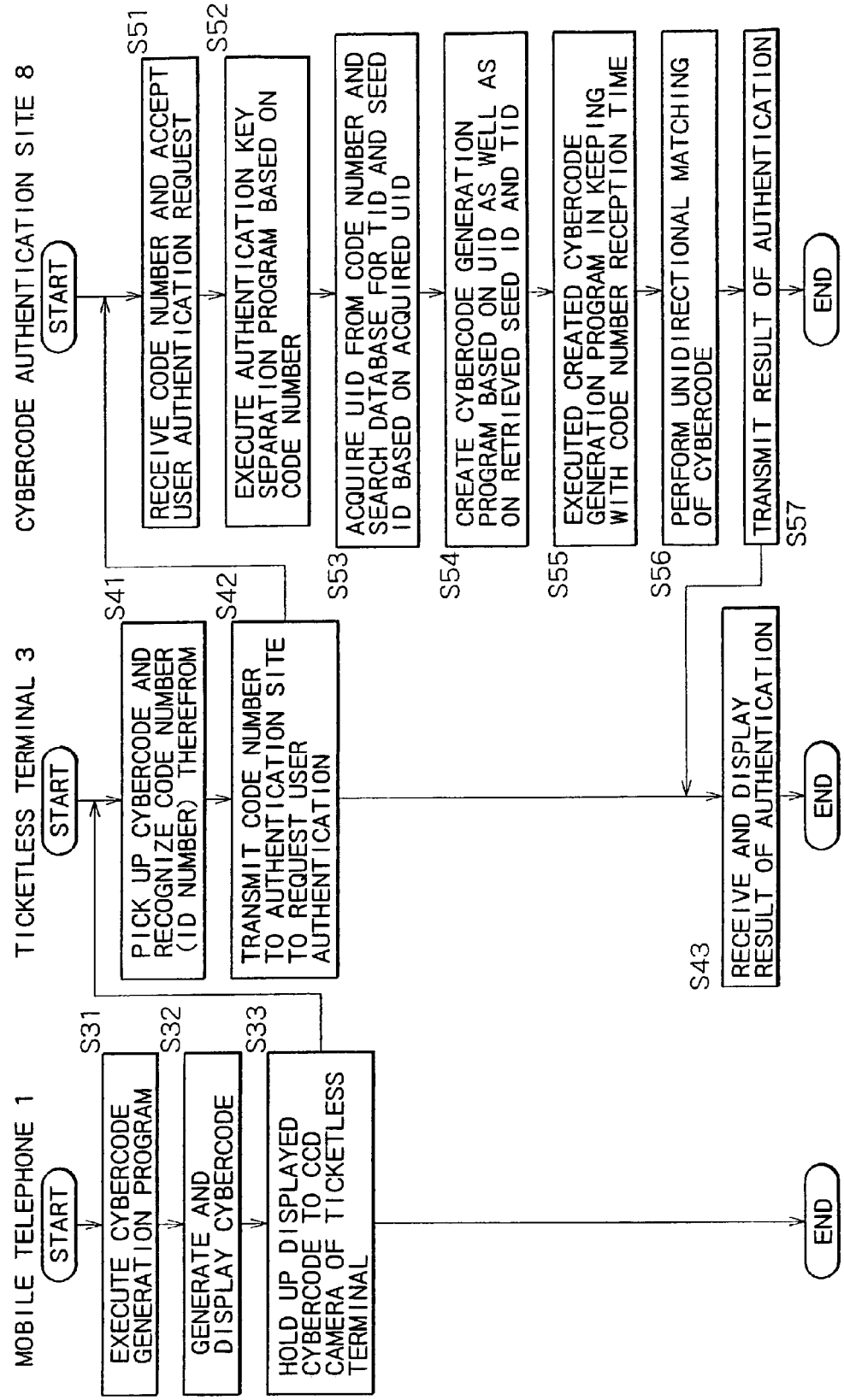
FIG. 20 is a flowchart of steps constituting a CyberCode authentication process.

Described below with reference to the flowchart of FIG. 20 is how the user of the mobile telephone 1 carries out the CyberCode generation program PID acquired (i.e., downloaded) as discussed above so as to generate a cyber-ticket substituting for an admission ticket to the concert to be held at the concert hall 4, as well as how the cyber-ticket is recognized by the ticketless terminal 3 so that a code number extracted from the ticket is authenticated by the CyberCode authentication site 8.

Initially, the user of the mobile telephone 1 causes the menu screen of FIG. 16 to appear on the LCD 35 and selects the item "Java applets" by manipulating the operation keys 41 or jog dial 44. In step S31, the Java applet execution program 85 supplies the display program 83 with a signal representing the operation performed by the user. The supplied signal causes the display program 83 to display a Java applet execution screen such as one in FIG. 21 on the LCD 35.

Figure 21:
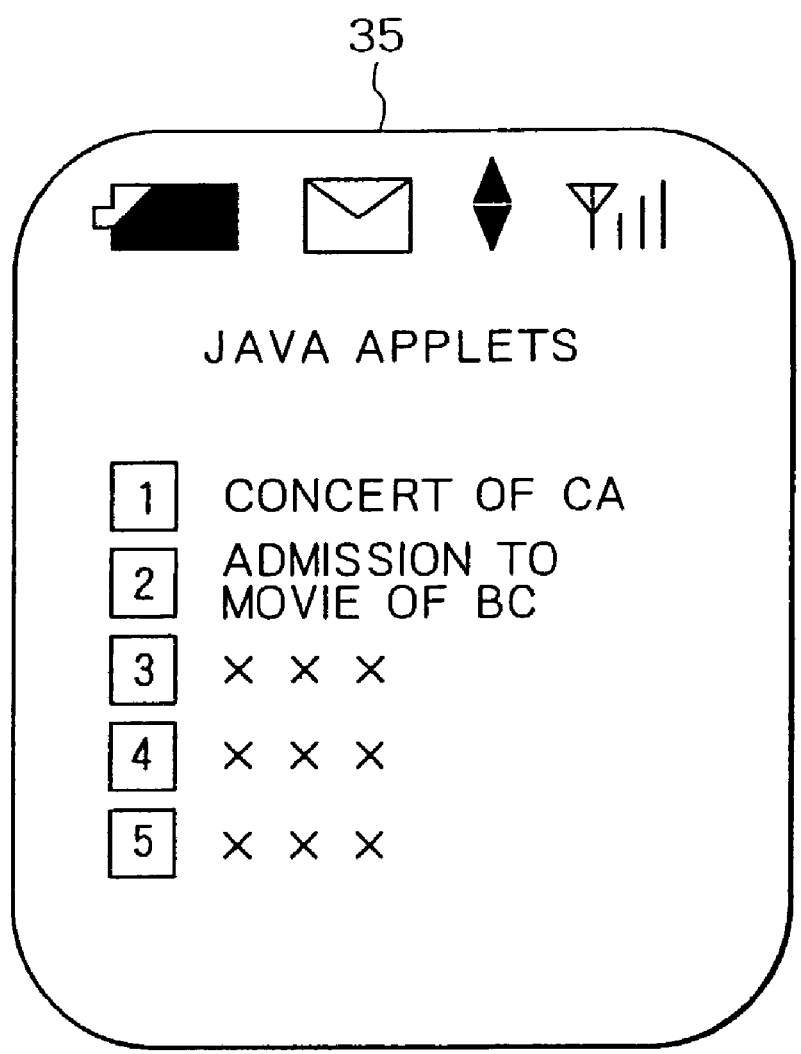
FIG. 21 is a schematic view of a Java (registered trademark) applet execution screen that appears on the liquid crystal display of the mobile telephone.

The Java applet execution screen of FIG. 21 shows such Java applet (CyberCode generation program PID) items as "Concert of CA." and "Admission to movie of BC" downloaded by the user. If the user selects the item "Concert of CA" using the operation keys 41 or jog dial 44, then the Java applet execution program 85 executes the CyberCode generation program PID corresponding to the selected item "Concert of CA"

Figure 22:
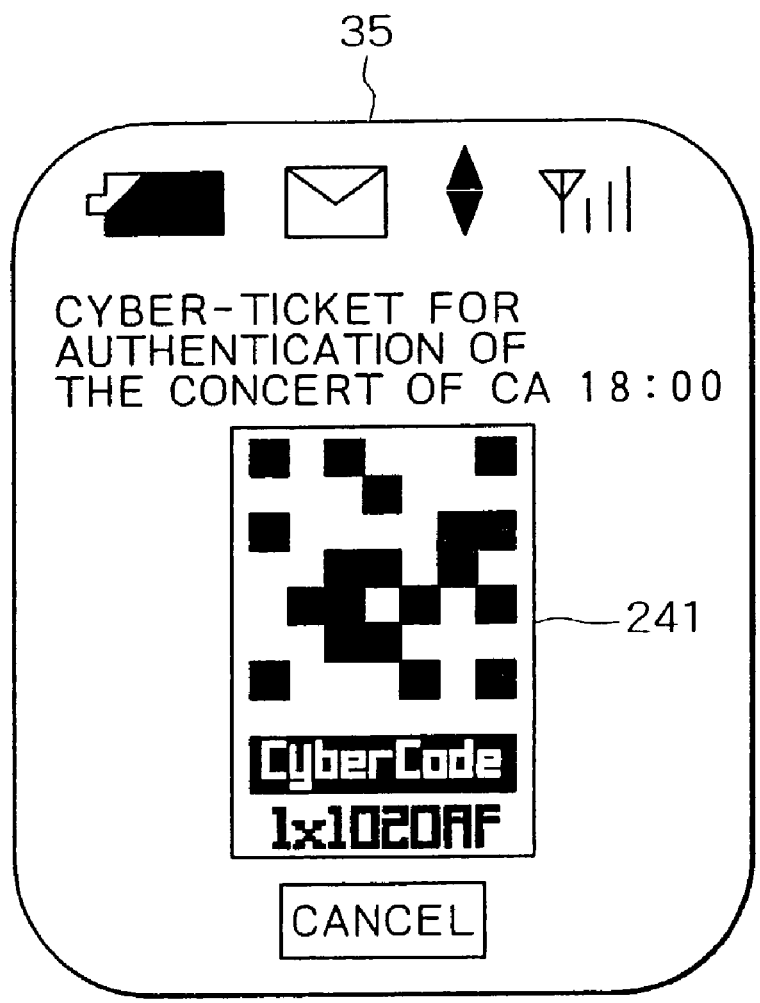
FIG. 22 is a schematic view of a CyberCode displayed on the liquid crystal display of the mobile telephone.

In step S32, the Java applet execution program 85 generates a CyberCode based on a current time Tu and causes the LCD 35 to display the generated CyberCode. For example, as shown in FIG. 22, the LCD 35 displays a generated CyberCode (cyber-ticket for authentication) 241 together with the current time and information indicating the content of the CyberCode such as "Cyber-ticket for authentication of the concert of CA"

Executing the CyberCode generation program PID generates the CyberCode 241 in keeping with the current time. The CyberCode 241 thus generated is updated (changed) at predetermined intervals (e.g., every 10 seconds) as shown in FIGS. 23A and 23B.

Figure 23:
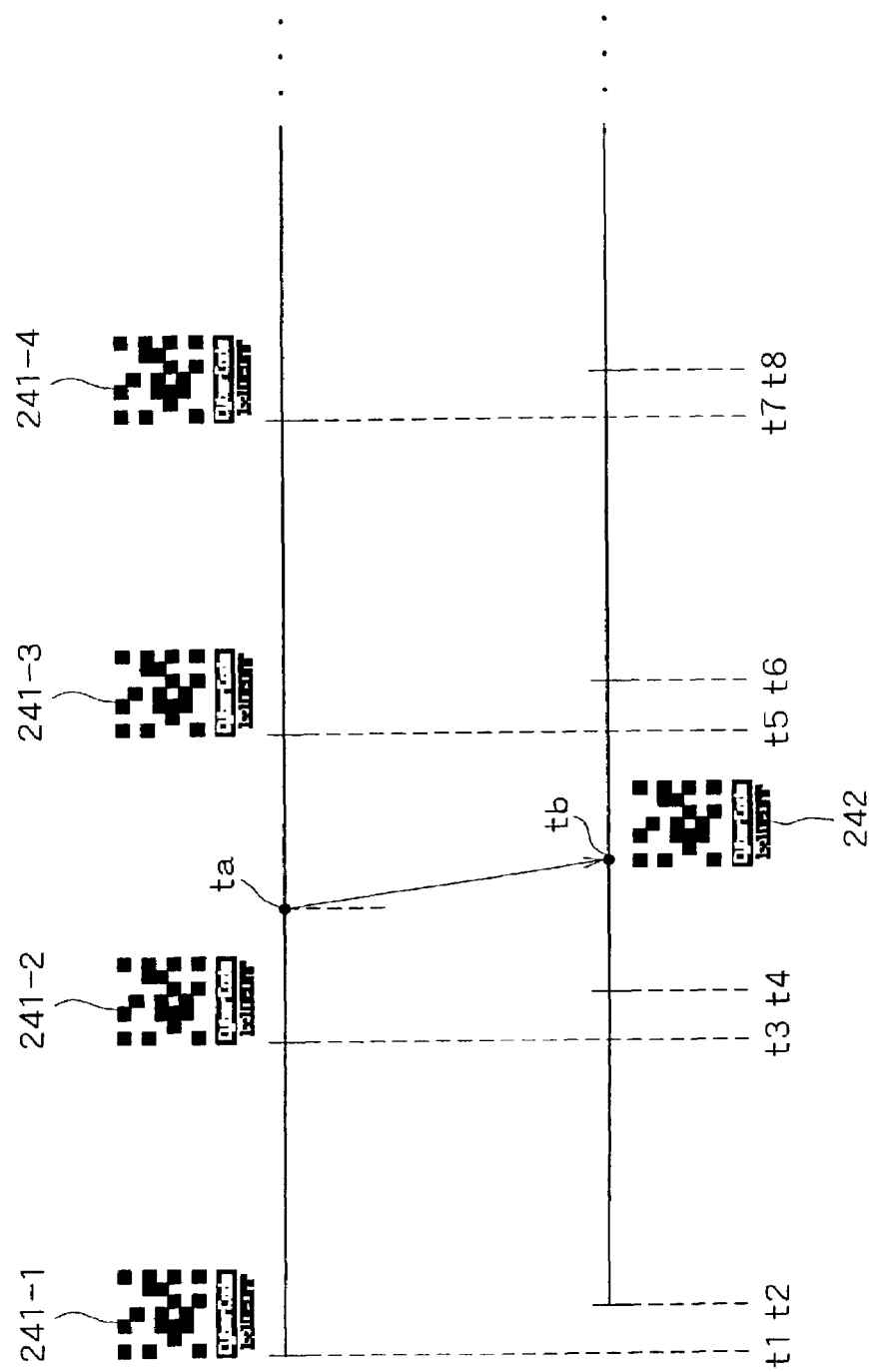
FIGS. 23A and 23B are schematic views showing how a generated CyberCode is varied.

In the example of FIGS. 23A and 23B, CyberCodes 241-1, 241-2, 241-3 and 241-4 are generated in keeping with times t1, t2, t3 and t4 respectively. In like manner, the CyberCode 241 is generated at predetermined intervals.

More specifically, the mobile telephone 1 first generates a CyberCode. The ticketless terminal 3 recognizes a code pattern of the generated CyberCode, acquires a code number out of the recognized pattern, and transmits the acquired code number to the CyberCode authentication site 8. The site 8 separates a user ID from the code number, generates a seed ID for random number generation in accordance with the separated user ID, and regenerates the CyberCode generation program PID based on the seed ID and user ID thus obtained and in keeping with a time of day of code number reception. A CyberCode is then generated by executing the CyberCode generation program to make sure that the CyberCode thus generated is identical to that which was created earlier by the mobile telephone 1.

In the example of FIGS. 23A and 23B, the CyberCode 241-2 is generated at time t3 and recognized at time ta. The code number obtained from the code pattern recognized out of the CyberCode is transmitted to the CyberCode authentication site 8. The site 8 ascertains that the received CyberCode is identical to that which is generated at time tb.

As described, the time Tu at which the mobile telephone 1 executed the CyberCode generation program PID is judged to be the same as a time ts at which the CyberCode generation program is again generated and executed by the CyberCode authentication site 8. That is, it is ascertained that the same CyberCode generation program PID is executed within a predetermined time period and the same CyberCode is generated thereby. The shorter the intervals at which the CyberCode 241 is generated, the shorter the valid period of the generated CyberCode. The shortened intervals of CyberCode generation reduce the possibility of the code being stolen, so that the accuracy of authentication is enhanced.

Returning to step S33 in FIG. 20, the user of the mobile telephone 1 holds the LCD 35 with its displayed CyberCode 241 up to the CCD camera 107 of the ticketless terminal 3. The LCD 35 is adjusted as needed in its position relative to the CCD camera 107 so that the displayed CyberCode 241 will be picked up by the camera.

Figure 24:
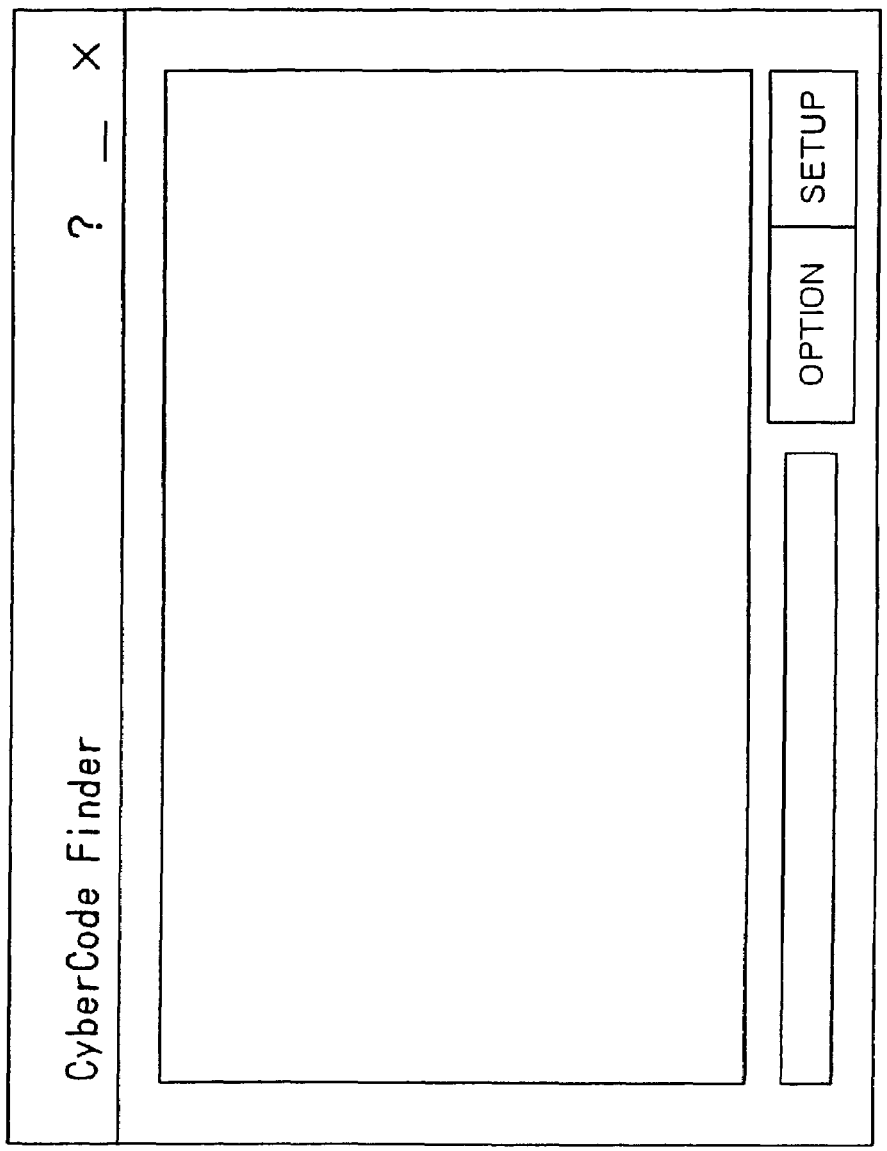
FIG. 24 is a schematic view of a typical screen that appears upon activation of a CyberCode finder.

At this point, the CyberCode finder 192 is assumed to be already active on the ticketless terminal 3. The LCD 109 of the terminal 3 shows a screen such as one in FIG. 24.

Figure 25:
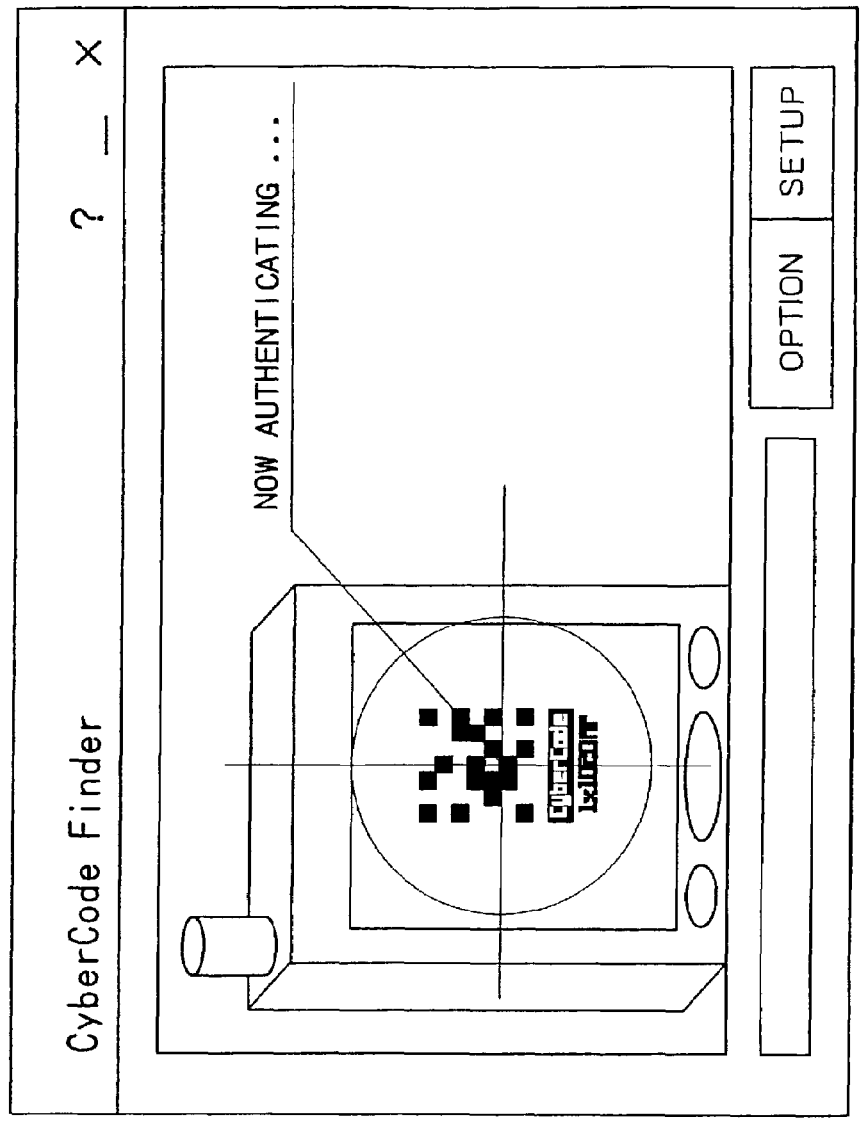
FIG. 25 is a schematic view of a typical screen that appears while CyberCode authentication is underway.

In step S41, the CyberCode finder 192 on the ticketless terminal 3 picks up an image of the LCD 35 by means of the CCD 107 and recognizes the CyberCode from the acquired image. The screen appearing on the LCD 109 at this point indicates a message such as "Now authenticating..." shown in FIG. 25, informing the user that the CyberCode is being authenticated.

The CyberCode finder 192 recognizes a code number from the code pattern of the CyberCode picked up from the obtained image. In step S42, the authentication program 193 transmits the recognized code number to the CyberCode authentication site 8, requesting the latter to proceed with user authentication.

In step S51, the CyberCode generation program issuing/authenticating server 11 of the CyberCode authentication site 8 receives the code number from the ticketless terminal 3 and accepts the request for user authentication. In step S52, the authentication key separation program 224 of the CyberCode generation program issuing/authenticating server 11 separates a user ID from the code number received in step S51.

In step S53, the authentication program 225 searches the registered user information database 12 for a user ID issue start time TID and a random number generation seed ID corresponding to the user ID separated in step S52. In step S54, the authentication program 225 again generates the CyberCode generation program PID based on the user ID separated in step S52 as well as on the issue start time TID and seed ID retrieved in step S53.

In step S55, the authentication program 225 generates the CyberCode 242 by carrying out the CyberCode generation program PID created in step S54 in keeping with the time of day of code number reception. In step S56, the authentication program 225 effects unidirectional matching (i.e., authentication process) based on both the code number derived from the code pattern of the CyberCode 242 created in step S55 and the code number received in step S51.

That is, the CyberCode authentication site 8 searches the registered user information database 12 for a user ID issue start time TID and a random number generation seed ID corresponding to the user ID included in the code number. The CyberCode generation program PID is again generated based on the issue start time TID and seed ID retrieved by the search. Executing the generated program PID in step S55 provides the code number of the CyberCode 242. This code number is compared in step S56 with the code number transmitted earlier from the ticketless terminal 3. A match verified between the two code numbers compared authenticates the user of the mobile telephone 1 as a legitimate user.

The authentication process involves verifying whether the valid period of the code number from the CyberCode has expired (e.g., whether any cyber-ticket for a concert held in the past has been copied and falsely presented here), or ascertaining whether the CyberCode submitted to authentication has been generated in accordance with another user's user ID, another time TID, and another seed ID for random number generation (e.g., whether the CyberCode has been generated by a different CyberCode generation program PID).

In step S57, the authentication program 225 transmits the result of the authentication process to the ticketless terminal 3 through the I/O management program 221, network interface 207, and the Internet 7.

In step S43, the authentication program 193 of the ticketless terminal 3 displays on the LCD 109 the result of authentication from the CyberCode authentication site 8. Illustratively, a message such as "Authentication successfully completed!" is displayed as shown in FIG. 26.

The steps described above allow the CyberCode authentication site 8 to create the CyberCode generation program PID based on the user ID of the user who requested the issue of a CyberCode through the mobile telephone 1, as well as on the time TID at which the request to issue the CyberCode generation program is received and on the seed ID for random number generation. The program thus generated is distributed to the requesting user and relevant user information is recorded to the registered user information database 12. At the time of authentication, the CyberCode authentication site 8 retrieves from the registered user information database 12 the time TID and random number generation seed ID corresponding to the user ID included in the code number sent from the ticketless terminal 3. Based on the time TID and seed ID thus acquired, the CyberCode authentication site 8 again generates the CyberCode generation program PID (i.e., creates the same CyberCode generation program PID as that of the user subject to authentication) and executes the program to create a CyberCode to be authenticated. The CyberCode generation program itself thus functions as an authentication key.

Because the CyberCode is generated in keeping with a specific time of day, the CyberCode is used as the only CyberCode that is valid at the time of authentication. Such term of validity is an added advantage of the CyberCode as an authentication key.

Figure 27A:
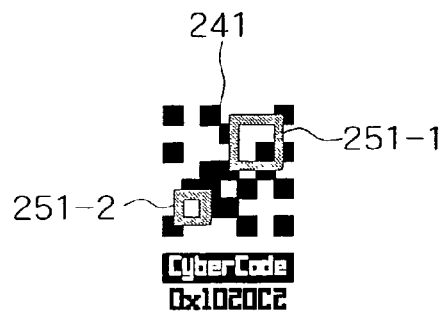
FIGS. 27A, 27B and 27C are schematic views illustrating how a user ID is embedded in a CyberCode.
Figure 27B:
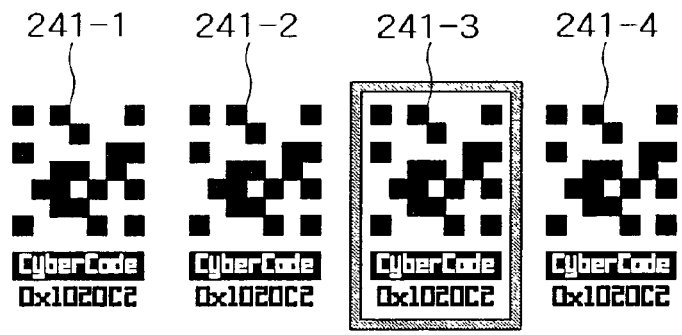
Figure 27C:
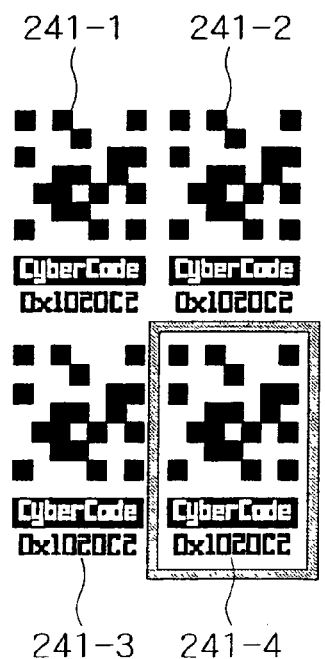

Although the user ID was described as embedded in the low-order four digits of the code number in the CyberCode, this is not limitative of the invention. Alternatively, as shown in FIG. 27A, the user ID may be embedded as part of the bit pattern constituting the CyberCode 241 (e.g., blocks 251-1 and 251-2). In another alternative shown in FIG. 27B, a plurality of CyberCodes 241-1 through 241-4 arranged on a time series basis may be used to represent a single code number, and one of the arranged CyberCodes (e.g., 241-3) may be employed as an embedded user ID. In yet another alternative shown in FIG. 27C, a plurality of CyberCodes 241-1 through 241-4 laid out in a given space may be used to constitute a single code number, and any one of these Cyber-Codes (e.g., 241-2) may be utilized as an embedded user ID.

The inventive ticketless system described above can eliminate major disadvantages associated with the i-appli function. The i-appli function is known to be subject to the following constraints:

(1) For the sake of data security, an i-appli program using its internal processing can access only the site form which the program was downloaded.

(2) For data security, no i-appli program using its internal processing is allowed to call up and establish connection with an arbitrarily selected site.

As a result, when a mobile telephone using a Java applet is to communicate with an authentication server for authentication purposes, that server must be the same as the server that issued the Java applet in question.

Where every user is to be assigned his or her unique authentication program, it is therefore necessary to construct an authentication server capable of addressing all events collectively.

In contrast, the inventive ticketless system circumvents the constraint on access destination by having the ticketless terminal 3 communicate with the CyberCode generation program issuing/authenticating server 11; the server 11 does not communicate with the mobile telephone 1 through which the CyberCode generation program (Java applet) was downloaded.

A CyberCode generation program issuing/authenticating server 11 may be set up for each event. The setup allows each user to download his or her unique CyberCode generation program and to gain access to a different authentication server for each different event.

Earlier, the CyberCode 241 displayed on the LCD 35 of the mobile telephone 1 was described as recognized by the ticketless terminal 3 and subjected to user authentication by the CyberCode generation program issuing/authenticating server 11 of the CyberCode authentication site 8 via a network such as the Internet. However, this is not limitative of the invention. Alternatively, the ticketless terminal 3 and the CyberCode generation program issuing/authenticating server 11 may be integrated in a single apparatus.

It was stated above that the CyberCode generation program is downloaded to the mobile telephone 1 and that the downloaded program is executed to display a CyberCode. Alternatively, such download, program execution and code display operations may be carried out by a portable personal computer, a portable device, a PDA (personal digital assistant), a PHS (Personal Handyphone System), or any other suitable device capable of executing the CyberCode generation program (Java applet) and displaying the resulting CyberCode.

Because the CyberCode generation program itself serves as an authentication key, the result from execution of the program is not limited to the generation of a CyberCode alone; an array of numerical characters, a sound, or a pictorial pattern may be generated instead.

Although it was stated that the CyberCode displayed on the LCD 35 of the mobile telephone 1 is used as a cyber-ticket for authentication purposes, this is not limitative of the invention. Alternatively, if the user selects the item "Currency for authentication" on the download screen of FIG. 17, the mobile telephone 1 may be arranged to access a bank with which the user does business and download from there a CyberCode generation program for generating virtual coins constituting a necessary amount that needs to be withdrawn from the user's bank account. This arrangement may be utilized by the user in purchasing products from an automatic vending machine or through a storefront terminal capable of recognizing the CyberCode. In practice, the user may get the currency for authentication (i.e., CyberCode) displayed on the LCD 35 of the mobile telephone 1 and have the currency authenticated in the manner described for electronic settlement of the payment for the purchase.

When the CyberCode generation program (Java applet) is downloaded to the mobile telephone 1, the storage capacity of the memory 86 could be exhausted. In such a case, any expired cyber-tickets for authentication (e.g., those past their corresponding concert dates) may be arranged to be automatically erased. If the user selects on the Java applet execution screen of FIG. 21 any Java applet whose term of validity has already expired, a warning message such as "The program cannot be executed because its valid period has expired" may be arranged to be indicated on the LCD 35.

As shown in FIG. 12, computer-installable, computer-executable programs designed to perform the above-described processes may be retained on such package media as the magnetic disc 211 (including flexible discs), optical disc 212 (including CD-ROM (compact disc read-only memory) and DVD (digital versatile disc)), magneto-optical disc 213 (MiniDisc or MD (registered trademark)), or semiconductor memory 214; or on a flash ROM, a hard disc drive or the like where the programs are stored temporarily or permanently. The programs are recorded as needed to the storage medium via interfaces such as routers and modems and through wired or wireless communication media such as local area networks, the Internet 7, and digital satellite broadcasting networks.

In this specification, the steps which are stored on a program storage medium and which describe the programs to be executed represent not only the processes that are carried out in the depicted sequence (i.e., on a time series basis) but also the processes that are conducted parallelly or individually.

In this specification, the term "system" refers to an entire configuration made up of a plurality of component devices. In one such system, the ticketless terminal 3 and CyberCode authentication site 8 may be structured integrally and may be connected to the mobile telephone 1 via a network.

With the authentication system according to the invention, as described above, the issuing element first issues a user ID to the mobile information terminal upon receipt of a request to issue a program from the mobile information terminal. A random number is then generated by the random number generating element based on the user ID issued by the issuing element and on a time of receipt of the issuing request. The registering element registers the random number and the time of receipt in conjunction with the user ID. A first program for creating a first image embedded with the user ID is generated by the first program generating element in accordance with the random number generated by the random number generating element, with the user ID, and with the time of receipt. The transmitting element transmits the first program thus generated by the first program generating element to the mobile information terminal. The first image displayed on the displaying element of the mobile information terminal is picked up by the image pickup element. The recognizing element recognizes first information corresponding to the first image picked up by the image pickup element while extracting the user ID from the first image concurrently. The random number and the time of receipt registered by the registering element are retrieved by the retrieving element in accordance with the user ID recognized by the recognizing element. A second program for creating a second image is generated by the second program generating element based on the random number, on the time of receipt retrieved by the retrieving element, and on the user ID. The authenticating element then authenticates the mobile information terminal displaying the first image, by verifying a match between second information corresponding to the second image generated by execution of the second program generated by the second program generating element on the one hand, and the first information recognized by the recognizing element on the other hand. The inventive system changes the user-specific program every time a different user is to be authenticated, and allows the program to function as an authentication key. The system thus ensures highly accurate user authentication.

As many apparently different embodiments of this invention may be made without departing from the spirit and scope thereof, it is to be understood that the invention is not limited to the specific embodiments thereof except as defined in the appended claims.

What is claimed is:

1. An authentication system for authenticating a mobile information terminal having displaying means for displaying an image, said authentication system comprising:
   issuing means for issuing a user ID to said mobile information terminal upon receipt of a request to issue a program from said mobile information terminal;
   random number generating means for generating a random number based on said user ID issued by said issuing means and on a time of receipt of the issuing request;
   registering means for registering said random number and said time of receipt in conjunction with said user ID;
   first program generating means for generating a first program for creating a first image embedded with said user ID, in accordance with said random number generated by said random number generating means, with said user ID, and with said time of receipt;
   transmitting means for transmitting said first program generated by said first program generating means to said mobile information terminal;
   image pickup means for picking up said first image displayed on said displaying means of said mobile information terminal;
   recognizing means for recognizing first information corresponding to said first image picked up by said image pickup means while extracting said user ID from said first image concurrently;
   retrieving means for retrieving said random number and said time of receipt registered by said registering means, in accordance with said user ID recognized by said recognizing means;
   second program generating means for generating a second program for creating a second image based on said random number, on said time of receipt retrieved by said retrieving means, and on said user ID; and
   authenticating means for authenticating said mobile information terminal displaying said first image, by verifying a match between second information corresponding to said second image generated by execution of said second program generated by said second program generating means on the one hand, and said first information recognized by said recognizing means on the other hand.

2. An authentication system according to claim 1, wherein said authentication system and said mobile information terminal are interconnected via a network.

3. An authentication system according to claim 1, wherein said mobile information terminal generates said first image by executing said first program and causes said displaying means to display said first image thus generated.

4. An authentication system according to claim 1, wherein said first image displayed on said displaying means of said mobile information terminal is a two-dimensional code.

5. An authentication system according to claim 1, wherein said first information and said second information denote a code number each.

6. An authentication system according to claim 1, further comprising an information providing apparatus and an information authenticating apparatus interconnected via a network,
   wherein said information providing apparatus comprises:
   issuing means for issuing a user ID to said mobile information terminal upon receipt of a request to issue a program from said mobile information terminal;
   random number generating means for generating a random number based on said user ID issued by said issuing means and on a time of receipt of the issuing request;
   registering means for registering said random number and said time of receipt in conjunction with said user ID;
   first program generating means for generating a first program for creating a first image embedded with said user ID, in accordance with said random number generated by said random number generating means, with said user ID, and with said time of receipt; and
   transmitting means for transmitting said first program generated by said first program generating means to said mobile information terminal, and
   wherein said information authenticating apparatus comprises:
   image pickup means for picking up said first image displayed on said displaying means of said mobile information terminal;
   recognizing means for recognizing first information corresponding to said first image picked up by said image pickup means while extracting said user ID from said first image concurrently;
   retrieving means for retrieving said random number and said time of receipt registered by said registering means, in accordance with said user ID recognized by said recognizing means;
   second program generating means for generating a second program for creating a second image based on said random number, on said time of receipt retrieved by said retrieving means, and on said user ID; and
   authenticating means for authenticating said mobile information terminal displaying said first image, by verifying a match between second information corresponding to said second image generated by execution of said second program generated by said second program generating means on the one hand, and said first information recognized by said recognizing means on the other hand.

7. An authentication method for authenticating a mobile information terminal having displaying means for displaying an image, said authentication method comprising the steps of:
   issuing a user ID to said mobile information terminal upon receipt of a request to issue a program from said mobile information terminal;
   generating a random number based on said user ID issued in said issuing step and on a time of receipt of the issuing request;
   registering said random number and said time of receipt in conjunction with said user ID;
   generating a first program for creating a first image embedded with said user ID, in accordance with said random number generated in said random number generating step, with said user ID, and with said time of receipt;

transmitting said first program generated in said first program generating step to said mobile information terminal;

picking up said first image displayed on said displaying means of said mobile information terminal;

recognizing first information corresponding to said first image picked up in said image pickup step while extracting said user ID from said first image concurrently;

retrieving said random number and said time of receipt registered in said registering step, in accordance with said user ID recognized in said recognizing step;

generating a second program for creating a second image based on said random number, on said time of receipt retrieved in said retrieving step, and on said user ID; and authenticating said mobile information terminal displaying said first image, by verifying a match between second information corresponding to said second image generated by execution of said second program generated in said second program generating step on the one hand, and said first information recognized in said recognizing step on the other hand.

* * * * *